(12) United States Patent
Seki et al.

(10) Patent No.: US 7,383,348 B2
(45) Date of Patent: Jun. 3, 2008

(54) DATA TRANSFER SCHEME USING CACHING TECHNIQUE FOR REDUCING NETWORK LOAD

(75) Inventors: Toshibumi Seki, Kanagawa (JP); Tatsunori Kanai, Kanagawa (JP); Kenichiro Yoshii, Tokyo (JP); Hideki Yoshida, Kanagawa (JP); Haruhiko Toyama, Kanagawa (JP); Hideaki Sato, Kanagawa (JP); Yasuhiro Kimura, Kanagawa (JP); Takayuki Miyazawa, Kanagawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 678 days.

(21) Appl. No.: 10/167,413

(22) Filed: Jun. 13, 2002

(65) Prior Publication Data

US 2003/0005047 A1 Jan. 2, 2003

(30) Foreign Application Priority Data

Jun. 13, 2001 (JP) .............................. 2001-179015
Jun. 13, 2001 (JP) .............................. 2001-179016

(51) Int. Cl.
*G06F 15/16* (2006.01)
(52) U.S. Cl. .................. 709/232; 709/219; 709/238; 711/119; 711/216; 711/113; 711/141
(58) Field of Classification Search ............... 711/119, 711/216, 113, 141
See application file for complete search history.

(56) References Cited

U.S. PATENT DOCUMENTS 2,002,007 A * 5/1935 Hanson .................. 219/97
5,931,904 A * 8/1999 Banga et al. ............... 709/217
6,185,625 B1 * 2/2001 Tso et al. .................. 709/247
6,377,991 B1 * 4/2002 Smith et al. ............... 709/226
6,427,187 B2 * 7/2002 Malcolm .................... 711/119
6,453,404 B1 * 9/2002 Bereznyi et al. ........... 711/171
6,567,817 B1 * 5/2003 VanLeer .................... 707/102
6,615,267 B1 * 9/2003 Whalen et al. ............. 709/229
2002/0078371 A1 * 6/2002 Heilig et al. ............... 713/200
2002/0178341 A1 * 11/2002 Frank ........................ 711/216
2004/0049598 A1 * 3/2004 Tucker et al. .............. 709/246

OTHER PUBLICATIONS

U.S. Appl. No. 10/092,540, filed Mar. 8, 2002, pending.
U.S. Appl. No. 10/094,462, filed Mar. 11, 2002, pending.
U.S. Appl. No. 10/167,413, filed Jun. 13, 2002, pending.
U.S. Appl. No. 10/253,517, filed Sep. 25, 2002, pending.
U.S. Appl. No. 10/167,413, filed Jun. 13, 2002, Seki et al.
U.S. Appl. No. 10/396,521, filed Mar. 26, 2003, Koba et al.

* cited by examiner

*Primary Examiner*—Bunjob Jaroenchonwanit
*Assistant Examiner*—Duyen M Doan
(74) *Attorney, Agent, or Firm*—Oblon, Spivak, McClelland, Maier & Neustadt, P.C.

(57) ABSTRACT

In a data transfer scheme using a caching technique and/or a compression technique which is capable of reducing the network load of a network connecting between data transfer devices, correspondences between data and their names are registered at the data transfer devices and the corresponding names are transferred, instead of transferring the data, for those data for which the correspondences are registered, so that it is possible to reduce the amount of transfer data among the data transfer devices. Server side data transfer devices and client side data transfer devices can be provided in multiple-to-one, one-to-multiple, or multiple-to-multiple manners.

5 Claims, 25 Drawing Sheets

| SERVER SIDE PROXY IDENTIFICATION INFORMATION | CONTENTS DEPENDENT INFORMATION |

FIG.5

```
<html>
<head>
  <title>The ACM SIG......
</head>
</body>
<h1>The ACM SIGMOD A......
 <center><table......
</table></center>
</body>
</html>
```
CONTENTS $f($ ⬚ $) =$ 9A32F639 F0EC7D15 91F6E173 8B82F4EB

HASH FUNCTION

FINGERPRINT

DATA TRANSFER SCHEME USING CACHING TECHNIQUE FOR REDUCING NETWORK LOAD

BACKGROUND OF THE INVENTION

1. Field of the Invention

The present invention relates to a data transfer scheme for carrying out data transfer at a data transfer device on behalf of another device.

2. Description of the Related Art

The client-server type information system formed by servers for providing various services through a network and clients for requesting desired services to the servers has been widely used. In particular, the World Wide Web system (which is also simply called Web) formed by Web servers and clients that communicate with each other by using the HTTP protocol on the Internet is the very widely used client-server type information system. Usually, a server program is operating on a server and a prescribed tool (program) such as a browser is operating on a client. The contents of the services provided on the Internet are also wide ranging so that there are various existing services including services for providing, delivering or transferring information such as that of text, still image, video and audio (home pages, e-mails, and digital contents, for example) or programs, electronic shop services for selling goods, reservation services for seats, rooms, etc., agency services for various contracts, etc., and services in new styles are appearing steadily.

Now, in the client-server type information system such as the Web, the service is provided basically by carrying out data transfer between the client and the server, regardless of the style of the service to be provided. Consequently, a capacity (bandwidth) of the network to be used for communications between the client and the server tends to be a bottleneck of the entire system. For this reason, usually, the caching technique has been used in order to reduce the network load.

In the case of the Web system, the browser or the like that is operating on the client often uses a cache mechanism for caching recently accessed data. In the Web, accesses are made by specifying information or services by using names called URLs, so that among data that are returned in response to information or services requested to the Web servers in the past, those data that are cachable are recorded in the cache on the client in correspondence with their URLs. In this case, when an information or service with the same URL as that recorded in the cache is requested, if it is possible to judge that the response data recorded in the cache has not become obsolete, it is possible to eliminate a communication between the client and the Web server by returning that response data recorded in the cache.

When a plurality of users are existing on a LAN inside offices of an enterprise, a LAN of a research organization or a LAN inside a home, it is also popular to provide a proxy server between that LAN and the Internet and provide the cache mechanism in the proxy server. The cache inside the client (the cache of the browser, for example) will be operated as a dedicated cache of that client or user, but the cache of the proxy server on the LAN will be operated as a cache shared by users of the plurality of clients or users. For this reason, the cache of the proxy server works even in the case of making an access to the URL accessed by the other (another client) in the past.

Now, in the Web, communications between the client and the server are carried out by the protocol called HTTP. The HTTP protocol uses a set of a "request message" to be sent from the client to the server and a "reply message" to be returned from the server to the client in response to that request.

The request message is formed by a "request header" and a "request body". The request header contains various information necessary for the access such as a URL for specifying an information or service to be accessed and a method name indicating the type of access. The request body contains data to be sent to the server. Such data contained in the request body are also referred to as "request data".

The reply message is formed by a "reply header" and a "reply body". The reply header contains information such as a processing result status, and the reply body contains the requested information or data of the processing result of the requested service. Such data contained in the reply body are also referred to as "reply data".

The major methods for the request message that are used for accesses of information or services include a "GET method" that reads out an information on the server, a "PUT method" that writes data of the user into the server, and a "POST method" that receives a processing result in response to the request. Besides them, methods such as a "DELETE method" are also defined.

In many cases, the request body of the request message in the GET method and the reply body of the reply message in the PUT method are empty. The request body of the request message in the POST message contains information to be used for the processing on the server side according to the need, and the reply body of the reply message in the POST method contains data obtained as a result of that processing.

The data to be read out from the server by the GET method can be classified into "dynamic data" that are to be generated at the server side at a time of each reading and "static data" that are to be returned as they are already stored at the server side. Among them, the dynamic data can possibly have different contents at different occasions of reading even for the same URL, so that in many cases, the server returns the reply message with the reply header that contains an indication that it is not cachable. Consequently, what are to be the caching targets among the Web data are the static data.

These static data can be classified into "shared data" that can be accessed by unspecified many users and "private data" for which the access control for allowing accesses only to the specific user is to be carried out by utilizing the user authentication. The former shared data are cachable for any caches. However, the latter private data are not cachable for a shared cache such as that of the proxy server (because there is a need for the server to return the private data after carrying out the user authentication). The private data are cachable in the case of a personal dedicated cache such as that of the browser.

In the POST method, the result of processing at the server side is to be returned so that the server returns the result by the reply message with the reply header that contains an indication that it is not cachable in general. For this reason, the reply data of the POST method are usually not the caching target.

In the PUT method, data are to be sent to the server so that there is no processing that involves the cache.

In the conventional Web cache, the caching targets are the static contents. Many information or services disclosed on the Web were used to be those disclosed to unspecified many users for which the information updating does not occur very frequently, so that the rate of the static contents were very high and therefore even the conventional caching technique was effective in reducing the network load.

However, in conjunction with the spread of a system in which the user makes accesses to the information or services on the server via the network by using the Web browser such as that of Web based ASP (Application Service Provider), the amount of data that cannot be handled by the conventional caching technique is increasing. For example:

- there are many private data for which the accessible users are limited by carrying out the user authentication;
- there are many dynamic data to be generated by referring to the back-end database;
- there are many cases of using the POST method such as those of the accounting slip processing and the searching; and
- there are many cases of using the PUT method for the purpose of sharing information within a group.

As a consequence, the use of the caching technique alone has been becoming rather ineffective as a method for reducing the network load.

BRIEF SUMMARY OF THE INVENTION

It is therefore an object of the present invention to provide a data transfer scheme using a caching technique and/or a compression technique which is capable of reducing the network load of a network connecting between data transfer devices.

According to one aspect of the present invention there is provided a data transfer device for receiving first data transmitted from a first communication device, transmitting the first data to one of other data transfer devices connected to one of second communication devices that is a destination of the first data, receiving second data transmitted from one of the second communication devices through one of the other data transfer devices, and transmitting the second data to the first communication device that is a destination of the second data, the data transfer device comprising: a reception unit configured to receive the first data from the first communication device; a cache unit configured to register cache data that were transmitted to one other data transfer device in past, in correspondence to cache data names each of which is generated according to a content of each cache data and assigned to each cache data, for each one of the other data transfer devices; a processing unit configured to carry out a processing for transmitting a first data name that is generated according to a content of the first data and assigned to the first data, instead of transmitting the first data, when the first data name is registered in the cache unit as corresponding to the one other data transfer device to which the first data should be transferred, or a processing for registering the first data in correspondence to the first data name into the cache unit as corresponding to the one other data transfer device, and transmitting the first data, when the first data name is not registered in the cache unit as corresponding to the one other data transfer device, upon receiving the first data transmitted from the first communication device; and a transmission unit configured to transmit the first data name or the first data to the one other data transfer device according to a processing carried out by the processing unit.

According to another aspect of the present invention there is provided a data transfer device for receiving first data transmitted from a first communication device, transmitting the first data to another data transfer device connected to a second communication device that is a destination of the first data, receiving second data transmitted from the second communication device through the another data transfer device, and transmitting the second data to the first communication device that is a destination of the second data, the data transfer device comprising: a reception unit configured to receive the first data from the first communication device; a cache unit configured to register cache data that were transmitted to the another data transfer device in past, in correspondence to cache data names each of which is formed by a prescribed data transfer device identification information for uniquely identifying the data transfer device among a plurality of data transfer devices for transmitting data to the another data transfer device and data dependent information generated according to a content of each cache data and assigned to each cache data; a processing unit configured to carry out a processing for transmitting a first data name that is generated according to a content of the first data and assigned to the first data, instead of transmitting the first data, when the first data name is registered in the cache unit, or a processing for registering the first data in correspondence to the first data name into the cache unit and transmitting the first data, when the first data name is not registered in the cache unit, upon receiving the first data transmitted from the first communication device; and a transmission unit configured to transmit the first data name or the first data to the another data transfer device according to a processing carried out by the processing unit.

According to another aspect of the present invention there is provided a data transfer method at a data transfer device for receiving first data transmitted from a first communication device, transmitting the first data to one of other data transfer devices connected to one of second communication devices that is a destination of the first data, receiving second data transmitted from one of the second communication devices through one of the other data transfer devices, and transmitting the second data to the first communication device that is a destination of the second data, the data transfer method comprising: receiving the first data from the first communication device; judging whether a first data name that is generated according to a content of the first data and assigned to the first data is registered in a cache unit, which is configured to register cache data that were transmitted to one other data transfer device in past, in correspondence to cache data names each of which is generated according to a content of each cache data and assigned to each cache data, for each one of the other data transfer devices; and carrying out a processing for transmitting the first data name, instead of transmitting the first data, when the first data name is registered in the cache unit as corresponding to the one other data transfer device to which the first data should be transferred, or a processing for registering the first data in correspondence to the first data name into the cache unit as corresponding to the one other data transfer device, and transmitting the first data, when the first data name is not registered in the cache unit as corresponding to the one other data transfer device.

According to another aspect of the present invention there is provided a data transfer method at a data transfer device for receiving first data transmitted from a first communication device, transmitting the first data to another data transfer device connected to a second communication device that is a destination of the first data, receiving second data transmitted from the second communication device through the another data transfer device, and transmitting the second data to the first communication device that is a destination of the second data, the data transfer method comprising: receiving the first data from the first communication device; judging whether a first data name that is generated according to a content of the first data and assigned to the first data is registered in a cache unit, which is configured to register cache data that were transmitted to the another data transfer device in past, in correspondence to cache data names each of which is formed by a prescribed data transfer device identification information for uniquely identifying the data transfer device among a plurality of data transfer devices for transmitting data to the another data transfer device and data dependent information generated according to a content of each cache data and assigned to each cache data; and carrying out a processing for transmitting the first data name, instead of transmitting the first data, when the first data name is registered in the cache unit, or a processing for registering the first data in correspondence to the first data name into the cache unit and transmitting the first data, when the first data name is not registered in the cache unit.

According to another aspect of the present invention there is provided a computer program product for causing a computer to function as a data transfer device for receiving first data transmitted from a first communication device, transmitting the first data to one of other data transfer devices connected to one of second communication devices that is a destination of the first data, receiving second data transmitted from one of the second communication devices through one of the other data transfer devices, and transmitting the second data to the first communication device that is a destination of the second data, the computer program product comprising: a first computer program code for causing the computer to receive the first data from the first communication device; a second computer program code for causing the computer to judge whether a first data name that is generated according to a content of the first data and assigned to the first data is registered in a cache unit, which is configured to register cache data that were transmitted to one other data transfer device in past, in correspondence to cache data names each of which is generated according to a content of each cache data and assigned to each cache data, for each one of the other data transfer devices; and a third computer program code for causing the computer to carry out a processing for transmitting the first data name, instead of transmitting the first data, when the first data name is registered in the cache unit as corresponding to the one other data transfer device to which the first data should be transferred, or a processing for registering the first data in correspondence to the first data name into the cache unit as corresponding to the one other data transfer device, and transmitting the first data, when the first data name is not registered in the cache unit as corresponding to the one other data transfer device.

According to another aspect of the present invention there is provided a computer program product for causing a computer to function as a data transfer device for receiving first data transmitted from a first communication device, transmitting the first data to another data transfer device connected to a second communication device that is a destination of the first data, receiving second data transmitted from the second communication device through the another data transfer device, and transmitting the second data to the first communication device that is a destination of the second data, the computer program product comprising: a first computer program code for causing the computer to receive the first data from the first communication device; a second computer program code for causing the computer to judge whether a first data name that is generated according to a content of the first data and assigned to the first data is registered in a cache unit, which is configured to register cache data that were transmitted to the another data transfer device in past, in correspondence to cache data names each of which is formed by a prescribed data transfer device identification information for uniquely identifying the data transfer device among a plurality of data transfer devices for transmitting data to the another data transfer device and data dependent information generated according to a content of each cache data and assigned to each cache data; and a third computer program code for causing the computer to carry out a processing for transmitting the first data name, instead of transmitting the first data, when the first data name is registered in the cache unit, or a processing for registering the first data in correspondence to the first data name into the cache unit and transmitting the first data, when the first data name is not registered in the cache unit.

Other features and advantages of the present invention will become apparent from the following description taken in conjunction with the accompanying drawings.

BRIEF DESCRIPTION OF THE DRAWINGS

FIG. 5 is a diagram for explaining a fingerprint to be used in one embodiment of the present invention.

DETAILED DESCRIPTION OF THE INVENTION

Referring now to FIG. 1 to FIG. 22, one embodiment of the data transfer scheme according to the present invention will be described in detail.

In the following, an exemplary case in which a WAN is the Internet, clients are connected to a user's office LAN, and the HTTP protocol is used will be described, but the present invention is also applicable to the cases where the WAN is other than the Internet, the cases where the clients are located at LAN other than the user's office LAN such as a LAN inside a home, and the cases where the protocol other than the HTTP protocol is to be used.

Figure 22:
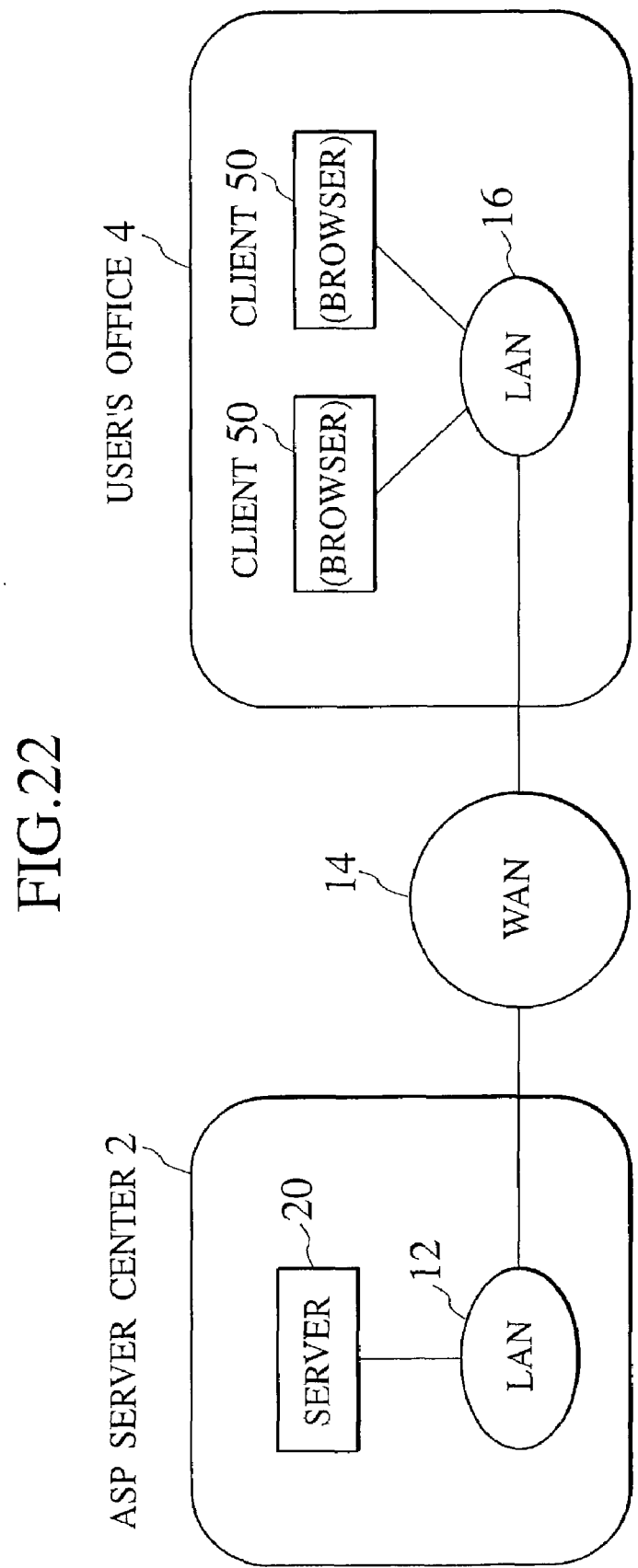
FIG. 22 is a diagram showing an exemplary configuration of a conventional computer network system to which the present invention is to be applied.

FIG. 22 shows an exemplary basic configuration of a computer network system to which the present invention is applied. In this exemplary configuration, a local area network (LAN) 12 inside an ASP server center 2 and a local area network (LAN) 16 inside a user's office 4 are connected through a wide area network (WAN) 14 such as the Internet or dedicated line, such that a server 20 inside the ASP server center 2 and a client 50 inside the user's office 4 are capable of carrying out communications through the LAN 12, the WAN 14 and the LAN 16. One or a plurality of servers 20 are connected to the LAN 12 inside the ASP server center 2 and one or a plurality of clients 50 are connected to the LAN 16 inside the user's office 4.

The Web based ASP provides services using various application programs from the server 20 provided at the ASP server center 2 through the WAN 14, and a user can access these services by using a Web browser or the like on the client 50 provided at the user's office 4.

Note that it is possible to have a plurality of the ASP server centers 2 and/or user's offices 4.

In such a configuration, the effective communication capacity (bandwidth) of the network connecting between the LAN 16 inside the user's office 4 and the LAN 12 inside the ASP server center 2, especially that of the WAN 14 such as the Internet, is lower than those of the LAN 12 inside the ASP server center 12 and the LAN 16 inside the user's office 4, so that it can become a bottleneck of the performance that can cause the communication delay and give rise to the problem of the lower response performance of the applications.

Figure 1:
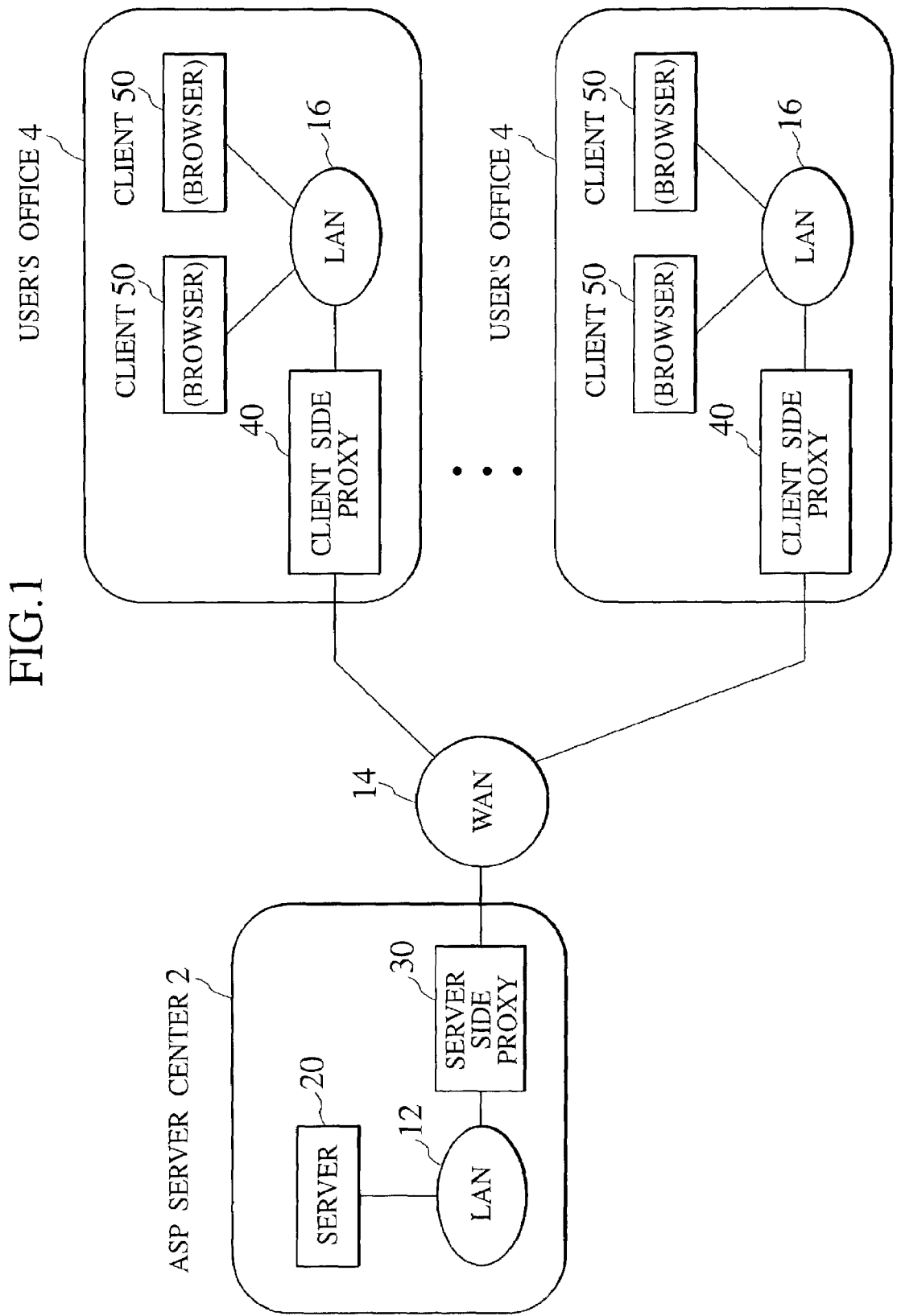
FIG. 1 is a diagram showing one exemplary configuration of a computer network system according to one embodiment of the present invention.

For this reason, in this embodiment, as shown in FIG. 1, two modules called a server side proxy 30 and a client side proxy 40 are provided at two ends of the WAN 14 that are connecting between the LAN 12 inside the ASP server center 2 and the LAN 16 inside the user's office 4 and a fingerprint compression (FP compression) to be described below is carried out between them, such that the amount of communication data is reduced and the bottleneck of the wide area network is resolved.

Note here that the following description is directed to the case of applying the FP compression to communications between one server side proxy 30 and a plurality of client side proxies 40 (the case where one client side proxy 40 carries out a communication to which the FP compression is applied, with one server side proxy 30 at a given timing).

Each one of the server 20, the server side proxy 30, the client proxy 40 and the client 50 can be realized in a form of operating a software (a server program, a server side proxy program, a client side proxy program, or a client program, respectively) on a computer. In this case, the computer will be provided with or connected with softwares such as OS, driver software, packet communication software and encryption software which have desired functions, and hardwares such as communication interface device, external memory device and input/output device. Also, in this case, it is preferable to use the graphical user interface (GUI) for the purpose of entering information from the user or a manager and presenting information to the user.

On the client 50 used by the user in order to utilize the service, a Web browser program or the like is operated according to the purpose. The user utilizes the service by sending a request message to a server that provides the desired service such as the information transfer or the order taking through the Internet from the Web browser and receiving a reply message, or repeating this procedure according to the need, for example. Of course, it is also possible to use a software other than the general purpose software like the Web browser, such as a dedicated software for the purpose of utilizing specific service. Also, the client can be a portable telephone terminal or the like that has the Internet function, for example, rather than the general purpose computer.

On the server 20, a prescribed server program is operated, to provide the service specific to that server site with respect to the user of the client 50.

Figure 2:
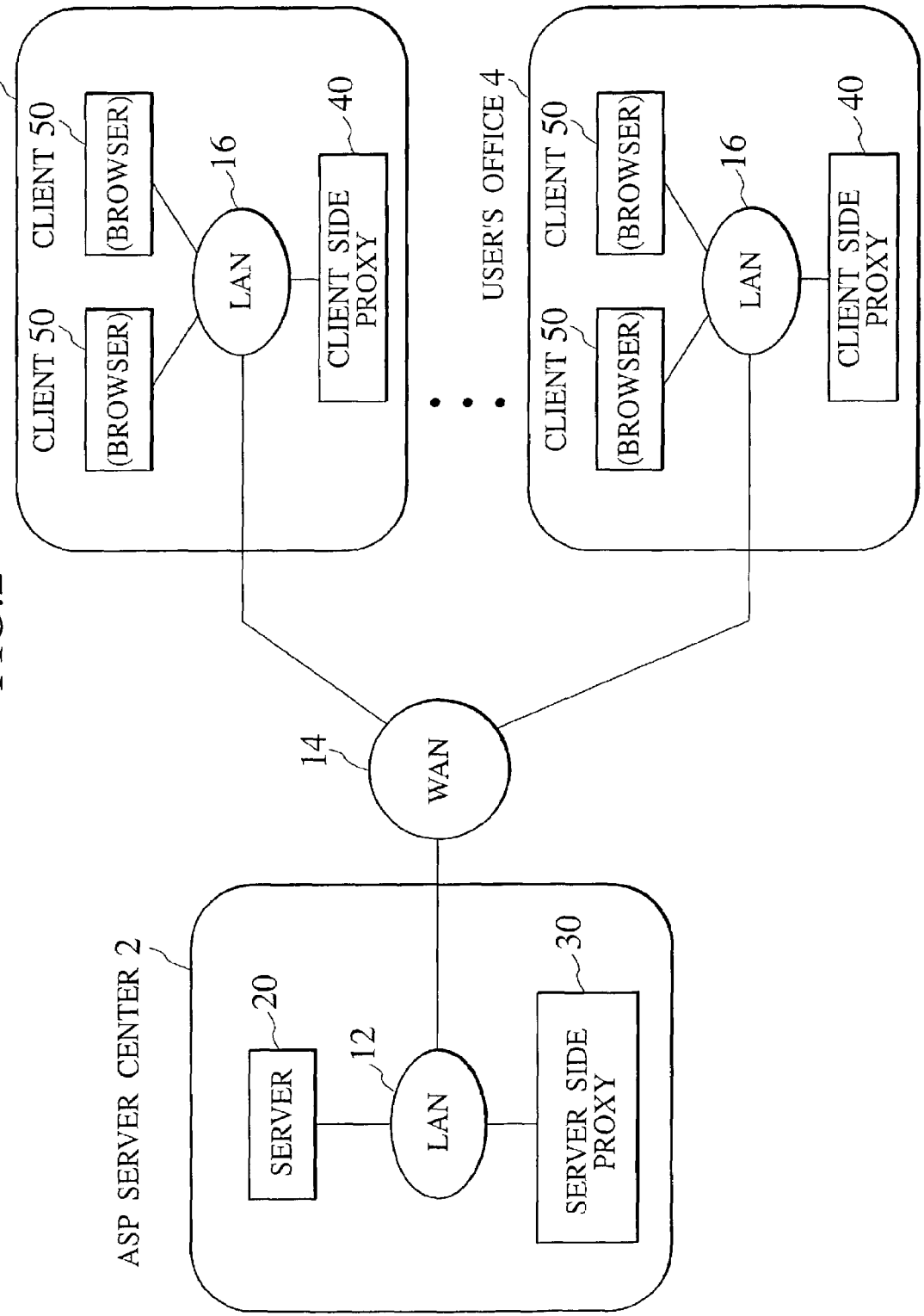
FIG. 2 is a diagram showing another exemplary configuration of a computer network system according to one embodiment of the present invention.

The server side proxy 30 can be provided to operate as a transparent proxy by being connected with both the LAN 12 inside the ASP server center 12 and the WAN 14 as shown in FIG. 1. The server side proxy 30 can also be provided on the LAN 12 inside the ASP server center 12 as shown in FIG. 2. The server side proxy 30 can also be realized as a built-in function of the server 20 as shown in FIG. 3.

Similarly, the client side proxy 40 can be provided to operate as a transparent proxy by being connected with both the LAN 16 inside the user's office 4 and the WAN 14 as shown in FIG. 1. The client side proxy 40 can also be provided on the LAN 16 inside the user's office 16 as shown in FIG. 2. The client side proxy 40 can also be realized as a built-in function of the browser or the like that operates on the client 50 as shown in FIG. 3. The client side proxy 40 can also be realized as a personal client side proxy that is operated on the client 50 on which the browser or the like is operated.

Figure 3:
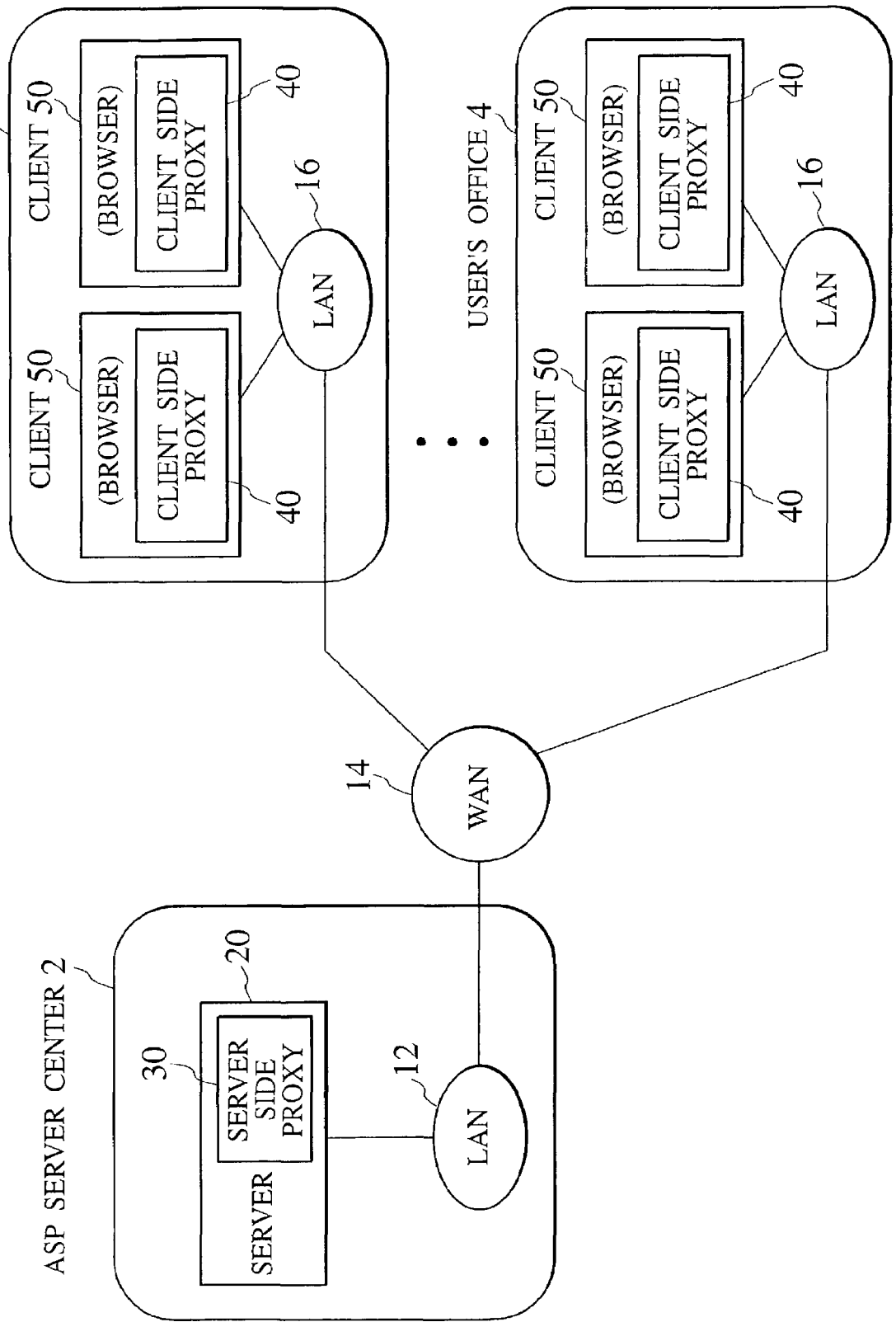
FIG. 3 is a diagram showing another exemplary configuration of a computer network system according to one embodiment of the present invention.

Note that the server side proxy 30 and the client side proxy 40 can be provided in the same form as shown in FIGS. 1 to 3. They can also be provided in different forms, such that some server side proxy 30 is provided in a form of FIG. 1, some other server proxy 30 is provided in a form of FIG. 2, some client side proxy 40 is provided in a form of FIG. 1, and some other slide side proxy 40 is provided in a form of FIG. 3, for instance.

Figure 4:
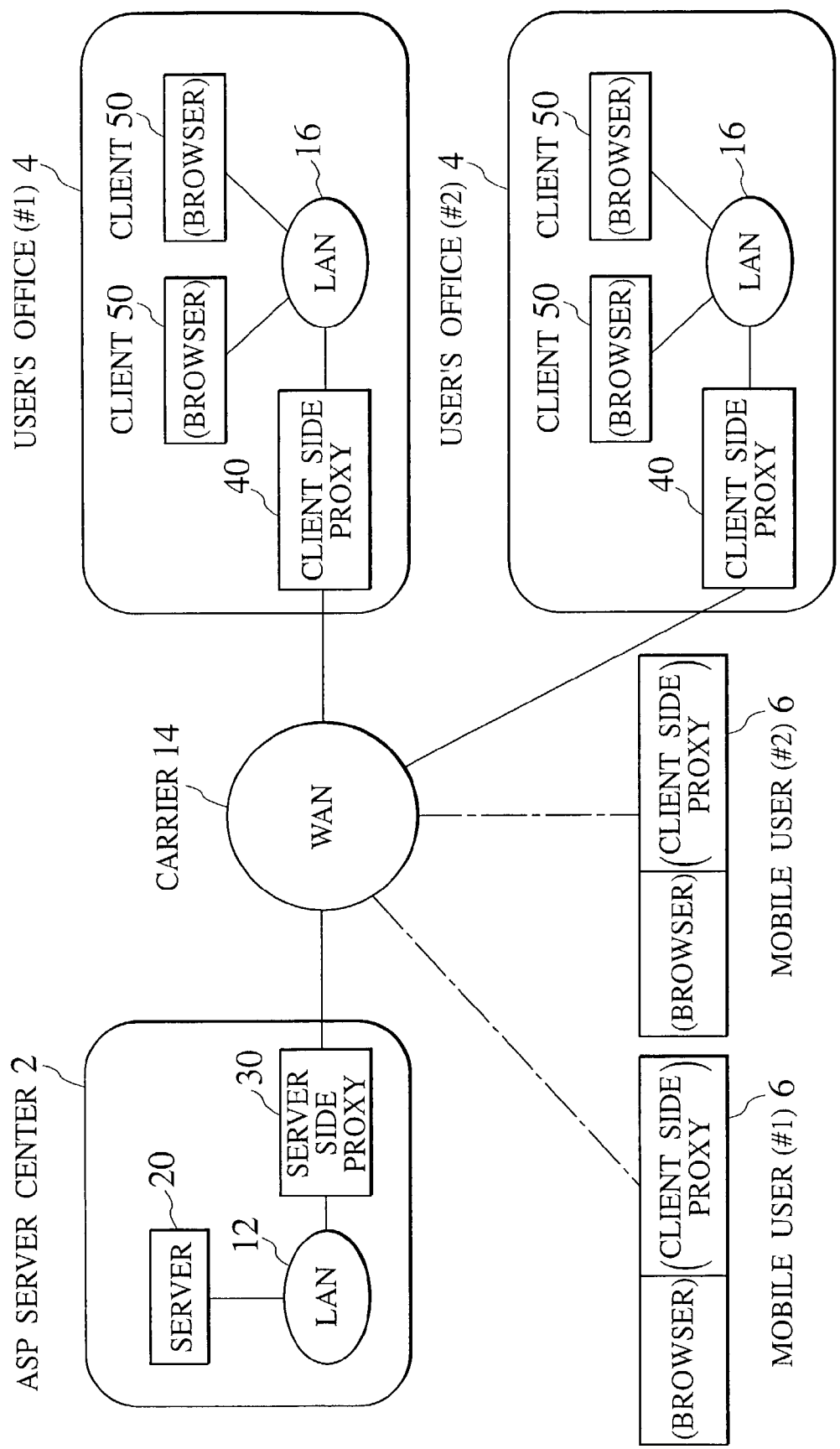
FIG. 4 is a diagram showing another exemplary configuration of a computer network system according to one embodiment of the present invention.

Also, the client side proxy 40 may be provided in a form of a built-in element of a mobile terminal or a mobile computer, as shown in FIG. 4, for example.

Each one of the server side proxy 30 and the client side proxy 40 of this embodiment has a caching mechanism called fingerprint cache (FP cache). The fingerprint cache records and manages data to be exchanged by the HTTP protocol, by using a name called fingerprint (FP).

As shown in FIG. 5, the fingerprint is a short numerical value that is determined by using a prescribed calculation method (a hash function in the example of FIG. 5) from the content of the data (contents in the example of FIG. 5) to be exchanged by the HTTP protocol. This numerical value may have a variable length, but the numerical value with a fixed length is easier to handle from a viewpoint of the ease of the processing.

As a method for calculating the fingerprint, it is possible to use the well known hash function such as MD-5, SHA-1, etc. These hash functions are already in use for the electronic signature with respect to data, and they can convert arbitrary data given to them into a numerical value of 128 bits in the case of MD-5 or a numerical value of 160 bits in the case of SHA-1. The characteristic of these hash function is that, when two data X1 and X2 are given and the data X1 and the data X2 are identical, the hash value calculated with respect to the data X1 and the hash value calculated with respect to the data X2 will be the same, but when two different data A and B are given, the hash value calculated with respect to the data A and the hash value calculated with respect to the data B will be different at a very high probability (there is a possibility for the hash values calculated with respect to two different data A and B to be the same in principle, but that possibility is negligibly small in practice).

Figure 6:
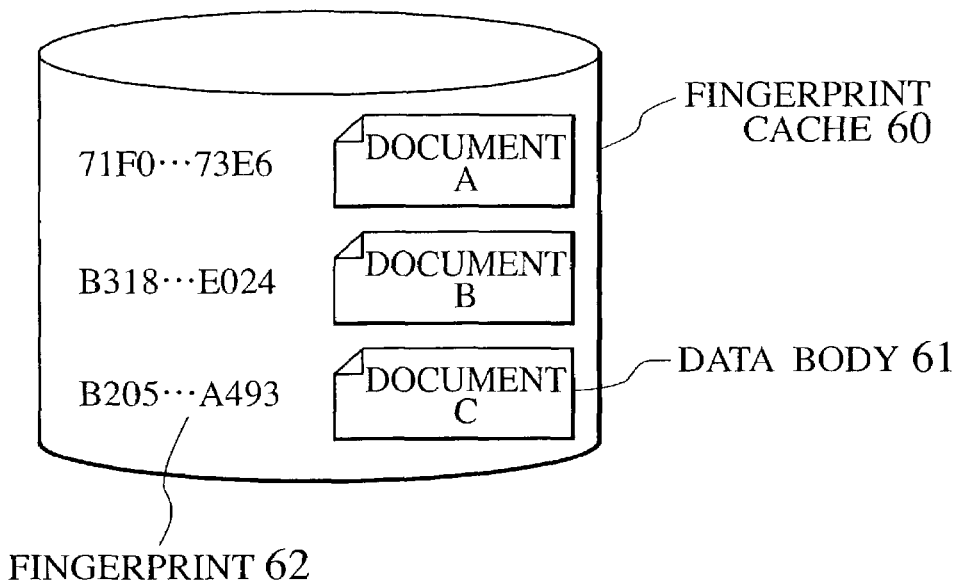
FIG. 6 is a diagram for explaining a fingerprint cache to be used in one embodiment of the present invention.

As shown in FIG. 6, the fingerprint cache 60 to be provided in the server side proxy 30 and the client side proxy 40 is recording and managing the data body 61 that were exchanged by using the HTTP protocol in the past, by using the fingerprint value 62 calculated from that data body 61 as its name. Note that, as will be described in detail below, the server side proxy 30 manages a correspondence between a fingerprint and data for each client side proxy 40 which is a correspondent of a communication to which the FP compression is to be applied.

For example, when the data are to be transferred from the server side proxy 30 to the client side proxy 40 by using the HTTP protocol, the server side proxy 30 calculates the fingerprint of that data, and if the data corresponding to that fingerprint exists in the fingerprint cache corresponding to that client side proxy 40, it implies that (data with the same content as) this data had been transferred to that client side proxy 40 in the past, so that the server side proxy 30 transfers the corresponding fingerprint value without transferring that data itself. The client side proxy 40 that received the fingerprint can reproduce the data to be transferred by taking out the data corresponding to that fingerprint value from the fingerprint cache. In this scheme (i.e., the sequence of data compression→data transfer→data decompression), it is possible to reduce the amount of data to be transferred through the network considerably because it suffices to send the fingerprint values for those data that are the same as the data already sent in the past.

Note that the server side proxy 30 can identify the client side proxy 40 to which the data received from the server 20 should be transferred, according to a prescribed communication regulation, for example.

Also, the client side proxy 40 can be provided in a configuration which uses the fingerprint that is described in a message from the server side proxy 30 at a time of the registration, a configuration which calculates the fingerprint itself as the fingerprint is not to be described in a message from the server side proxy 30, or a configuration which calculates the fingerprint itself even though the fingerprint is described in a message from the server side proxy 30.

For the convenience of the explanation, the compression of the amount of transfer data by replacing the data body of a message with the fingerprint by utilizing the fingerprint cache at a time of the data transfer between the server side proxy 30 and the client side proxy 40 will be referred to as a fingerprint compression (FP compression) hereafter.

Note that every message can be a target for applying the FP compression (i.e., a target for which the processing to replace the data with the fingerprint is to be carried out) between the server side proxy 30 and the client side proxy 40, but it is also possible to set those messages that satisfy a prescribed condition as not targets for applying the FP compression (which are always to be transferred without the FP compression), in order to omit the application of the FP compression with respect to those messages for which the fingerprint cache effect cannot be expected, for example.

In this case, the prescribed condition can be that a prescribed information is described in the message header, for example. More specifically, the prescribed condition can be that an information indicating the GET method and an information indicating the request are described in the message header, for example. As another example, the prescribed condition can be that data to be transferred is null or in a very compact size. Of course there are many other variations for the prescribed condition, and it is also possible to use a plurality of conditions in combination.

Note that the setting regarding the application target of such FP compression can be the same for the entire system or can be made for each pair of the server side proxy 30 and the client side proxy 40. Also, in the latter case, the setting can be made in advance or the setting can be made at each session.

Next, with references to FIG. 7A to FIG. 11, the message format to be used between proxies (for a message that is a target for applying the FP compression) at a time of the data transfer between the server side proxy 30 and the client side proxy 40 will be described.

The message that is not a target for applying the FP compression can be transferred between proxies in an original message format (at a time of receiving it at the FP compression side (transmitting side) proxy) without making any change. It is also possible to transfer such a message by providing an information capable of identifying that this message is not a target for applying the FP compression in the message header, for example, at the FP compression side (transmitting side) proxy.

Now, in the case of the data transfer between the server side proxy 30 and the client side proxy 40, the messages that are targets for applying the FP compression include those messages (compressed messages) in which data is FP compressed and replaced with the fingerprint and those messages (non-compressed messages) in which data is loaded without applying the FP compression.

The non-compressed message format is used when data contained in the message is not registered in the fingerprint cache of the server side proxy 30 corresponding to its transfer target client side proxy 40. On the other hand, the compressed message format is used when data contained in the message is registered in the fingerprint cache of the server side proxy 30 corresponding to its transfer target client side proxy 40.

At the decompression side (receiving side), the registration of data into the fingerprint cache can be carried out at a timing of receiving the message in the non-compressed format.

Figure 7A:
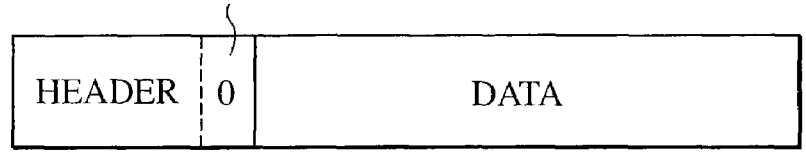
FIGS. 7A and 7B are diagrams showing exemplary message formats that can be used in one embodiment of the present invention.
Figure 7B:
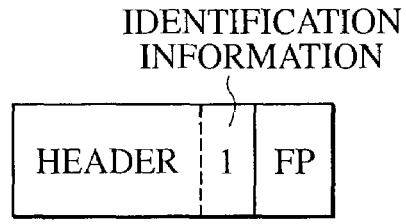

FIGS. 7A and 7B show exemplary message formats, where FIG. 7A shows the non-compressed message and FIG. 7B shows the compressed message.

In FIG. 7A, the data is loaded on the message body, whereas in FIG. 7B, the fingerprint (FP) is loaded on the message body instead of the data. Also, in this example, an identification information for enabling identification of the presence or absence of the FP compression is described in a message header (at the compression side proxy), and the presence or absence of the FP compression is identified according to this identification information (at the decompression side proxy) (the compression is absent if it is 0, the compression is present if it is 1, for example). Note that the identification information can be a special one to be used between proxies or one that utilizes a field already existing in the ordinary HTTP message header, either independently or in combination with the original purpose of that field.

Figure 8:
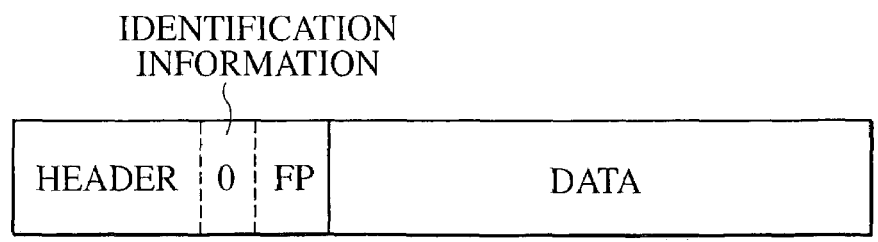
FIG. 8 is a diagram showing another exemplary message format that can be used in one embodiment of the present invention.

Note that, in the example of FIG. 7A, in the case of the non-compression, the fingerprint is not included in the message but it is also possible to include the fingerprint in the message body in addition to the data, or it is also possible to include the fingerprint in the message header as shown in FIG. 8. In this way, it is possible to omit a task to obtain the fingerprint from the data again at a time of carrying out the registration of the data into the fingerprint cache at the decompression side, because the fingerprint included in the message can be utilized directly.

Note that, in the case where messages that are not targets for applying the FP compression can exist, it is also possible for the decompression side (receiving side) to judge whether it is a message that is a target for applying the FP compression or a message that is not a target for applying the FP compression according to whether the above described identification information is contained in the message header or not. It is also possible to provide the identification information in the header of the message that is not a target for applying the FP compression, so as to identify three types of the messages by this identification information (a message that is not a target for applying the FP compression if it is 01, (a message that is a target for applying the FP compression and) the compression is absent if it is 10, and (a message that is a target for applying the FP compression and) the compression is present if it is 11, for example).

Figure 9A:
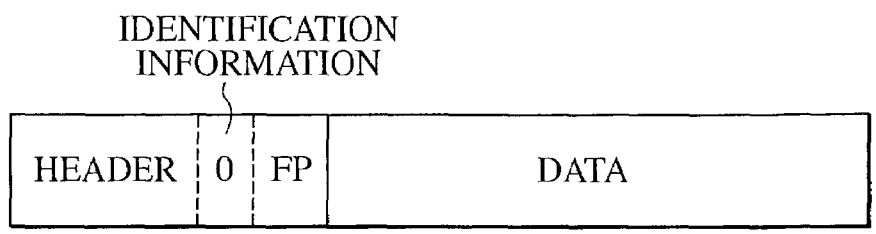
FIGS. 9A and 9B are diagrams showing another exemplary message formats that can be used in one embodiment of the present invention.
Figure 9B:
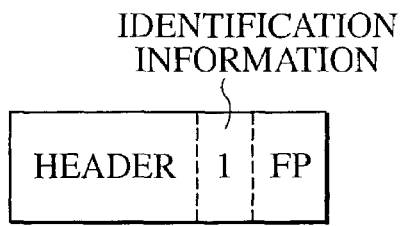

FIGS. 9A and 9B show another exemplary message formats, where FIG. 9A shows the non-compressed message and FIG. 9B shows the compressed message.

In FIG. 8A, the data is loaded on the message body, whereas in FIG. 8B, the message body is null. Also, in this example, the fingerprint (FP) is described in the message header in both formats. The identification information for enabling identification of the presence or absence of the FP compression is the same as in the above described example.

Note that, in this case, it is also possible to use the message format similar to that of FIG. 7A in the case of the non-compression (a format that does not contain the fingerprint).

Note that, in the case where messages that are not targets for applying the FP compression can exist and the compression side (transmitting side) proxy has a configuration for always describing the fingerprint in the message header of the message that is a target for applying the FP compression, it is also possible for the decompression side (receiving side) to judge whether it is a message that is a target for applying the FP compression or a message that is not a target for applying the FP compression according to whether the fingerprint is contained in the message header or not, besides the method based on the identification information described above.

Figure 10A:
FIGS. 10A and 10B are diagrams showing another exemplary message formats that can be used in one embodiment of the present invention.
Figure 10B:
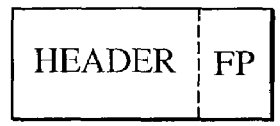

FIGS. 10A and 10B show still another exemplary message formats, where FIG. 10A shows the non-compressed message and FIG. 10B shows the compressed message.

In FIG. 10A, the data is loaded on the message body, whereas in FIG. 10B, the message body is null. Also, in this example, the fingerprint (FP) is described in the message header in both formats. However, in this example, the identification information for enabling identification of the presence or absence of the FP compression is not used.

In this example, the presence or absence of the FP compression can be identified according to whether the message body is null or not. However, in the case where messages that are not targets for applying the FP compression and that have the null message body can exist, it is possible to judge whether it is the compressed message that is a target for applying the FP compression or a message that is not a target for applying the FP compression and that has the null message body according to whether the fingerprint is contained in the message header or not, for example. It is also possible to provide an information indicating whether it is a message that is a target for applying the FP compression or not in the message header.

Figure 11:
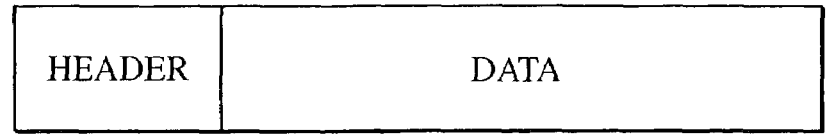
FIG. 11 is a diagram showing another exemplary message format that can be used in one embodiment of the present invention.

Note that it is also possible to use a format in which the fingerprint is not described in the message as shown in FIG. 11 in the case of the non-compression. In this case, it is possible to identify the presence or absence of the FP compression according to whether the fingerprint is contained in the message header or not. However, in the case where messages that are not targets for applying the FP compression can exist, it is possible to provide an information indicating whether it is a message that is a target for applying the FP compression or not in the message header, for example.

In the following, the operation in the case of applying the FP compression/decompression to the reply data at a time of transferring the reply message from the server side proxy 30 to the client side proxy 40 will be described in detail.

Figure 12:
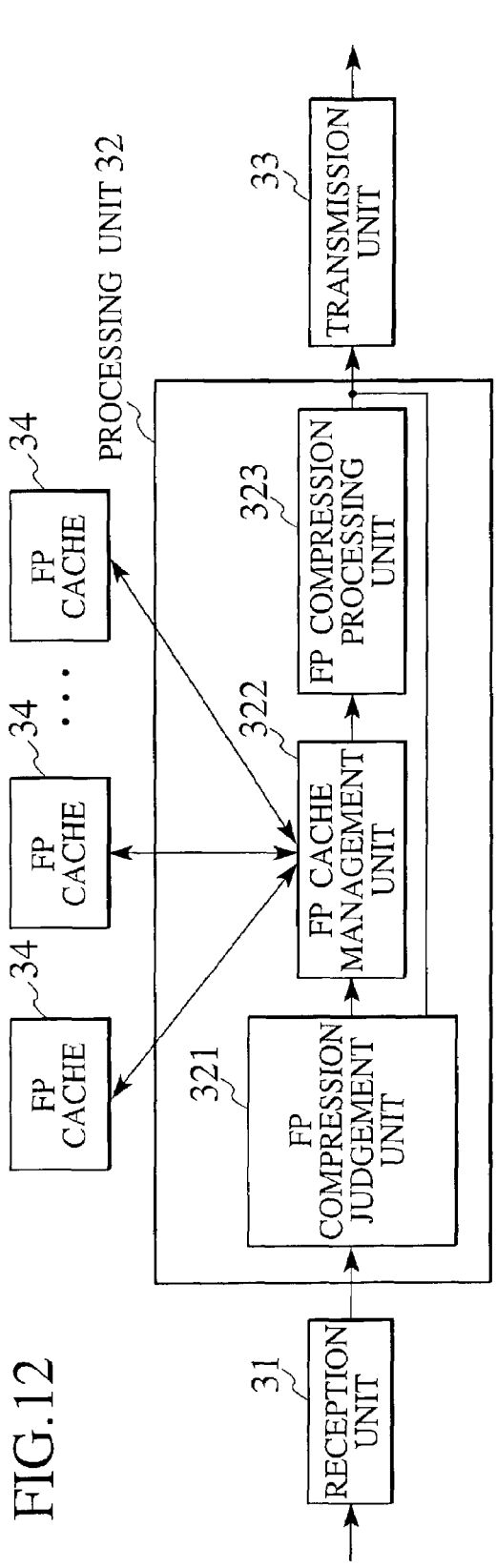
FIG. 12 is a block diagram showing one exemplary configuration of a server side proxy according to one embodiment of the present invention.
Figure 13:
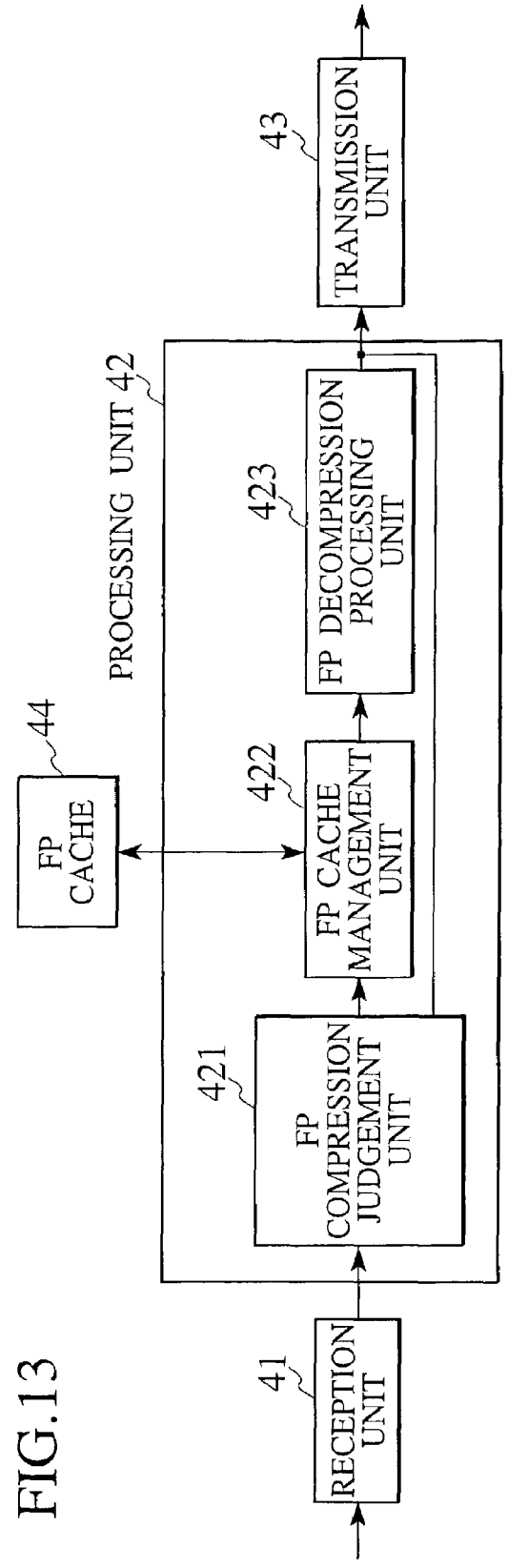
FIG. 13 is a block diagram showing one exemplary configuration of a client side proxy according to one embodiment of the present invention.

FIG. 12 shows an exemplary configuration of the server side proxy 30 in this embodiment, and FIG. 13 shows an exemplary configuration of the client side proxy 40 in this embodiment. Note that FIG. 12 and FIG. 13 mainly show configurations relevant to the data transfer from the server side proxy 30 to the client side proxy 40.

As shown in FIG. 12, the server side proxy 30 has a reception unit 31 for carrying out a processing for receiving a transfer message from the LAN 12 inside the ASP server center 2 or the wide area network 14, a processing unit 32 for applying the FP compression to data contained in the transfer message, a transmission unit 33 for carrying out a processing for transmitting the transfer message to the LAN 12 inside the ASP server center 2 or the wide area network 14, and fingerprint caches (FP caches) 34 for storing the fingerprint and its source data in correspondence. Also, the processing unit 32 has a fingerprint (FP) compression judgement unit 321 for judging whether the data contained in the transfer message should be a compression target or not, a fingerprint cache (FP cache) management unit 322 for carrying out the search and the registration with respect to the fingerprint caches 34, and a fingerprint (FP) compression processing unit 323 for carrying out a processing for replacing the data contained in the transfer message with the corresponding fingerprint.

Now, the FP cache management unit 322 manages a correspondence between the fingerprint and the data for each client side proxy 40 which is a correspondent of a communication to which the FP compression is to be applied. There are many variations for a form of realizing this management. In the following, some of them will be described (note that FIG. 12 shows a configuration in which the FP cache 34 is provided logically in correspondence to each one of the client side proxies 40.

Figure 14:
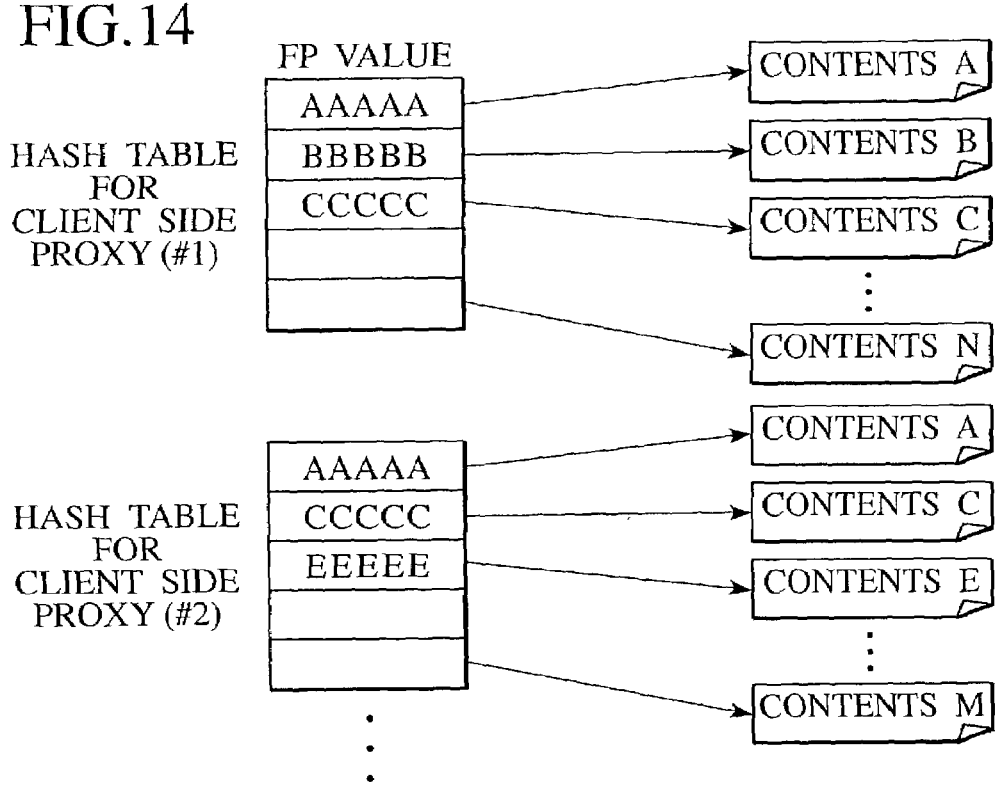
FIG. 14 is a diagram showing one exemplary data structure of a ringerpring cache that can be used in one embodiment of the present invention.

(1) FIG. 14 shows an exemplary configuration in which a hash table is provided for each client side proxy 40 and data corresponding to the fingerprint is also stored for each client side proxy 40 (a copy is stored for each one of the client side proxies even when they have the same contents).

In this case, the FP cache management unit 322 identifies the FP cache 34 corresponding to the client side proxy 40 which is the data transfer target, and checks whether the fingerprint corresponding to that data is stored in that FP cache 34 or not.

Figure 15:
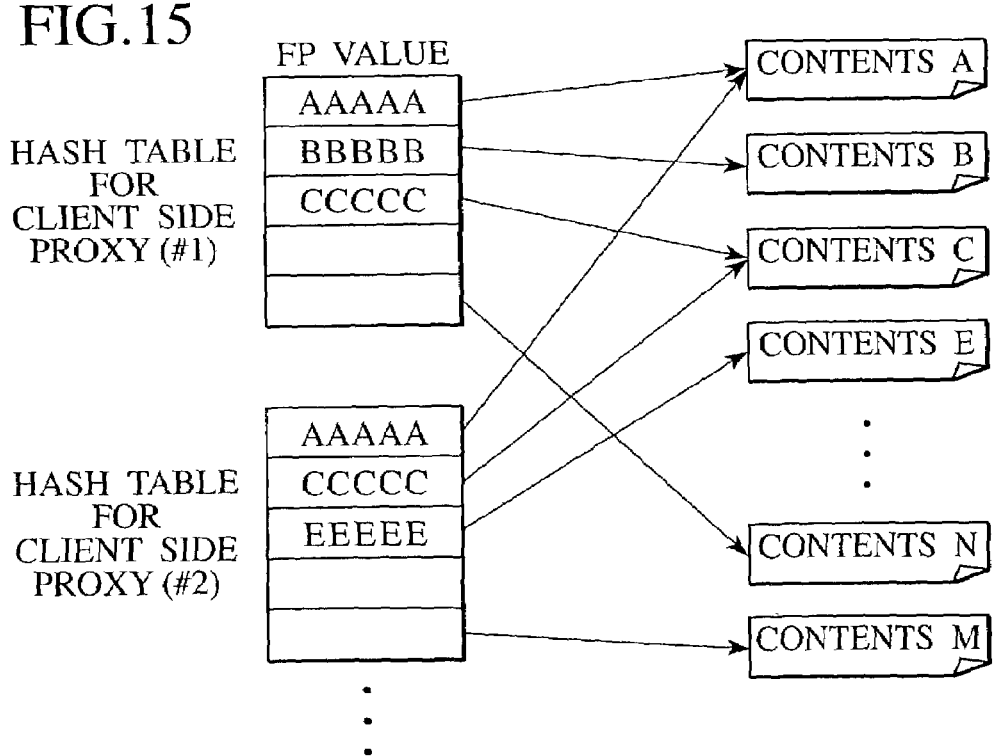
FIG. 15 is a diagram showing another exemplary data structure of a ringerpring cache that can be used in one embodiment of the present invention.

(2) FIG. 15 shows an exemplary configuration in which a hash table is provided for each client side proxy 40 but only one copy of the same contents is stored and information on pointers to the data is stored in the hash table (note that the different client side proxies 40 that have the same fingerprint value will have respective data stored if the contents of the original data contents are different).

In this case, the FP cache management unit 322 identifies the FP cache 34 corresponding to the client side proxy 40 which is the data transfer target, and checks whether the fingerprint corresponding to that data is stored in that FP cache 34 or not.

Figure 16:
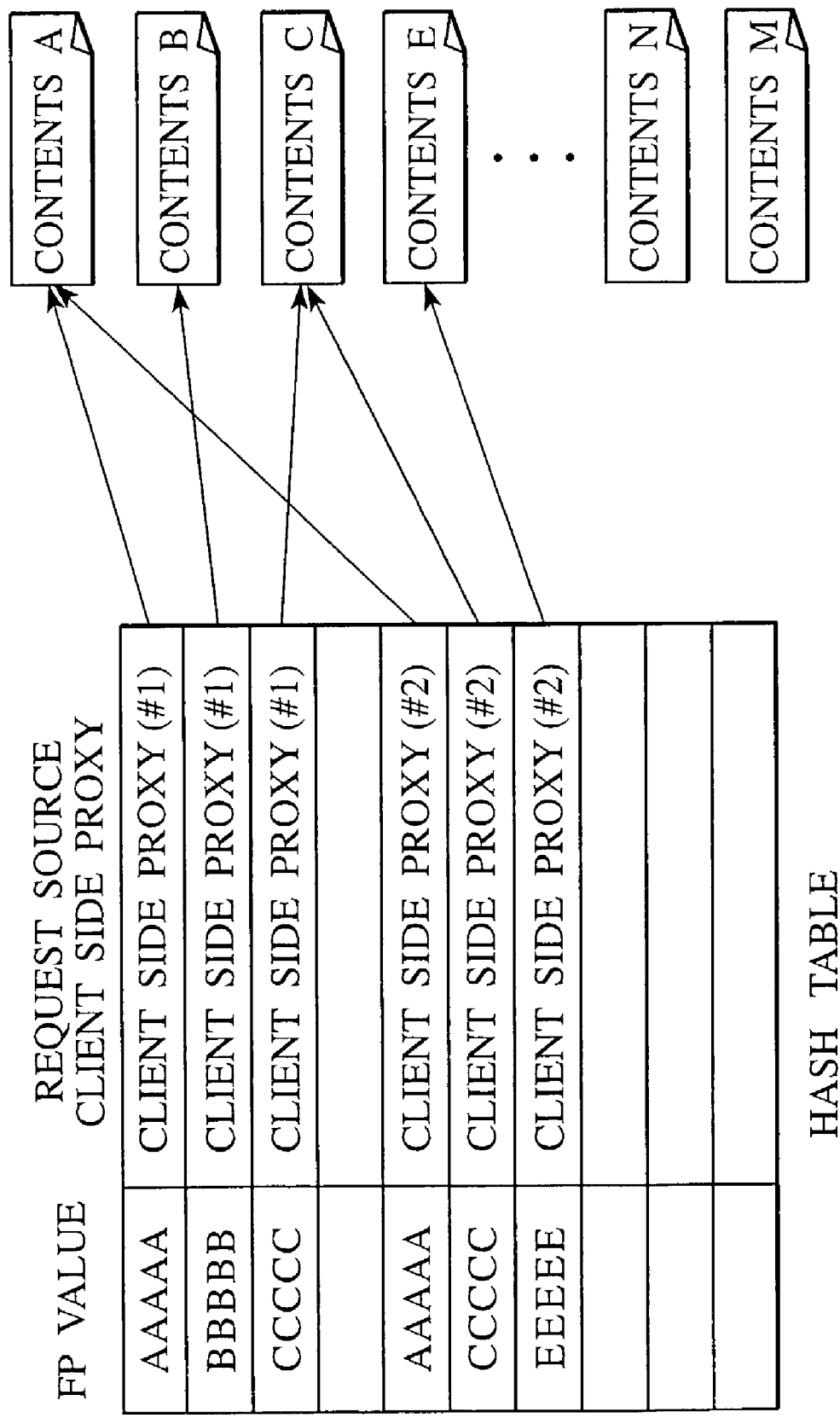
FIG. 16 is a diagram showing another exemplary data structure of a ringerpring cache that can be used in one embodiment of the present invention.

(3) FIG. 16 shows an exemplary configuration in which a hash table is not provided for each client side proxy 40 but a client side proxy identification information for identifying the client side proxy which is the data transfer target corresponding to that fingerprint is added to the hash table such that the client side proxy identification information and the fingerprint value are stored in pair. Note that FIG. 16 shows a configuration in which only one copy of the same contents is stored and information on pointers to the data is stored in the hash table, but it is also possible to use a configuration for storing data for each entry as in the above (1). Note also that the order of storing the fingerprint value and the client side proxy identification information may be reversed from that shown in FIG. 16.

The client side proxy identification information is information capable of uniquely identifying the client side proxy, which can be provided by an IP address, a MAC address, a host ID, a channel identifier, or information capable uniquely identifying any one of them.

In this case, the FP cache management unit 322 identifies the client side proxy identification information of the client side proxy 40 which is the data transfer target, and checks whether a pair of that client side proxy identification information and the fingerprint corresponding to that data is stored in the FP cache 34 or not.

Figure 17:
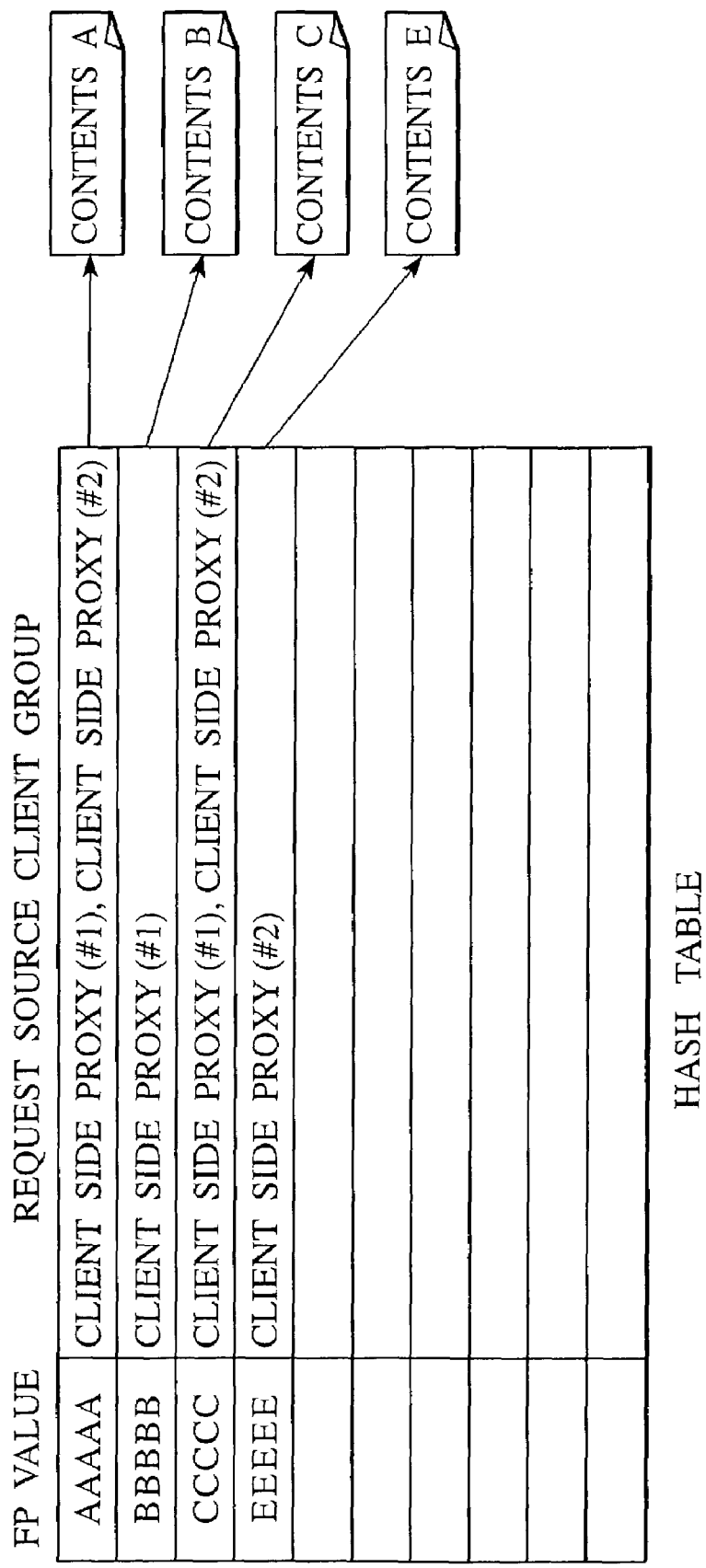
FIG. 17 is a diagram showing another exemplary data structure of a ringerpring cache that can be used in one embodiment of the present invention.

(4) FIG. 17 shows an exemplary configuration in which the FP cache 34 is not provided for each client side proxy 40 but a hash table stores the fingerprint value in correspondence to a client side proxy identification information group (request source client group) capable of utilizing that fingerprint.

In this case, the FP cache management unit 322 identifies the client side proxy identification information of the client side proxy 40 which is the data transfer target, and checks whether the fingerprint corresponding to that data is stored in the FP cache 34 or not, and whether that client side proxy identification information is stored among the client side proxy identification information group corresponding to that fingerprint or not.

Next, as shown in FIG. 13, the client side proxy 40 has a reception unit 41 for carrying out a processing for receiving a transfer message from the LAN 16 inside the user's office 4 or the wide area network 14, a processing unit 42 for applying the FP decompression to data contained in the transfer message, a transmission unit 43 for carrying out a processing for transmitting the transfer message to the LAN 16 inside the user's office 4 or the wide area network 14, and a fingerprint cache (FP cache) 44 for storing the fingerprint and its source data in correspondence. Also, the processing unit 42 has a fingerprint (FP) compression judgement unit 421 for judging whether the data contained in the transfer message should be a compression target or not and the presence or absence of the FP compression with respect to the transfer message, a fingerprint cache (FP cache) management unit 422 for carrying out the search and the registration with respect to the fingerprint cache 44, and a fingerprint (FP) decompression processing unit 423 for carrying out a processing for decompressing the original data from the fingerprint contained in the FP compressed transfer message.

Note that the FP compression judgement unit 321 on the compression side and the FP compression judgement unit 421 on the decompression side judge whether the data contained in that message should be a target for applying the FP compression or not, by checking whether the message satisfies a prescribed condition or not as described above. In the case of setting every message as a target for applying the FP compression, the FP compression judgement unit 321 on the compression side and the corresponding part of the exemplary procedure to be described below are unnecessary, and the FP compression judgement unit 421 on the decompression side and the corresponding part of the exemplary procedure to be described below are also unnecessary. Note also that the FP compression judgement unit 421 on the decompression side judges whether the data of the message that is a target for applying the FP compression is FP compressed or not.

In the following, the case of transferring the message that is a target for applying the FP compression (the case in which the message is judged as a target for applying the FP compression or the case in which every message is set as a target for applying the FP compression) will be mainly described.

Figure 18:
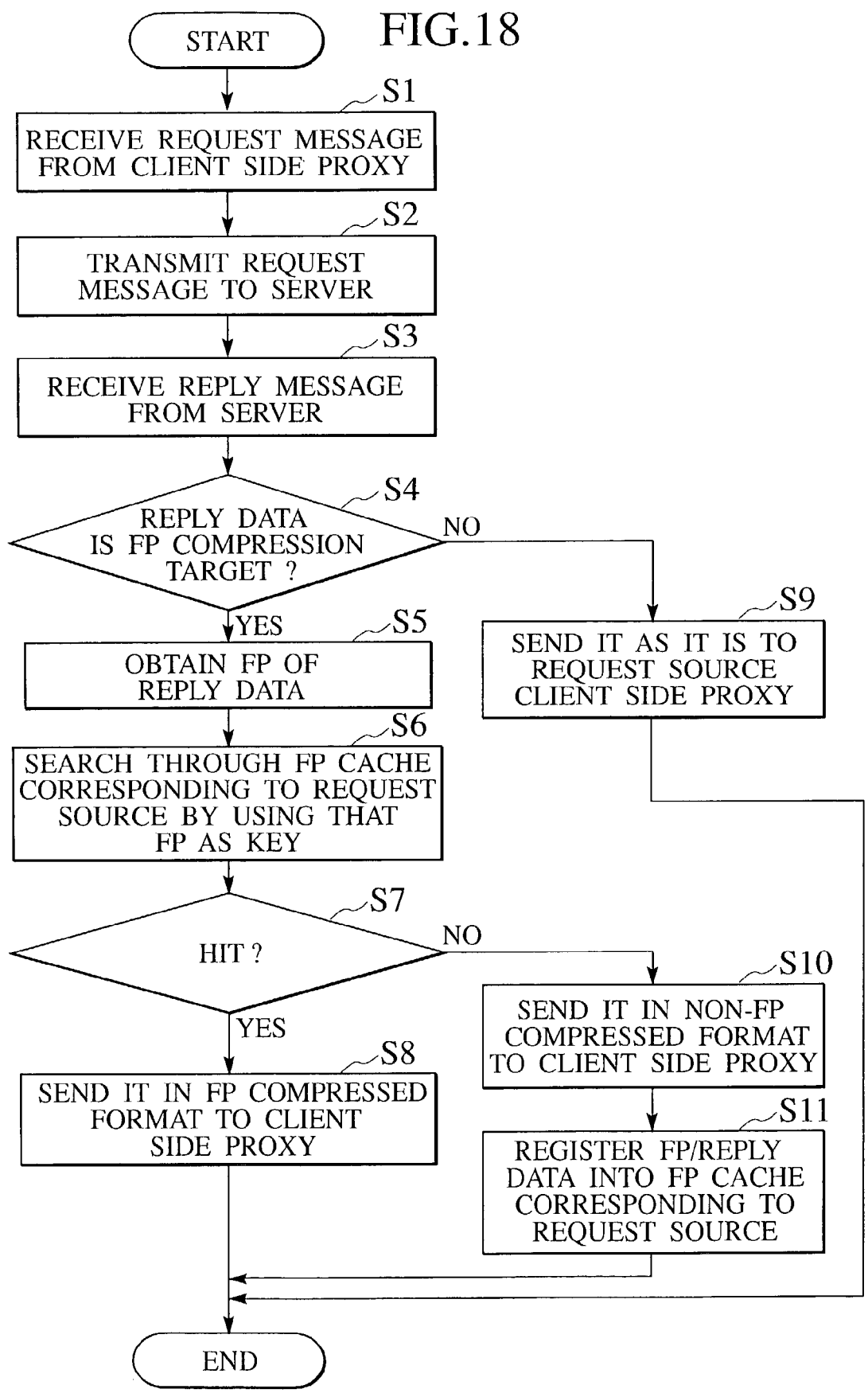
FIG. 18 is a flow chart showing one exemplary processing procedure of the server side proxy of FIG. 12 according to one embodiment of the present invention.

FIG. 18 shows an exemplary processing procedure of the server side proxy 30 since receiving the request message from the client side proxy 40 until transferring the reply message to that client side proxy 40.

Note that FIG. 18 shows the processing of the server side proxy 30 in the case of receiving one request message from the client side proxy 40, but when the request messages are received simultaneously from a plurality of client side proxies 40, the processing of FIG. 18 is carried out in parallel when each request is received.

Note also that FIG. 18 is an exemplary procedure for the case where the FP compression is not used in the transfer of the request message from the client side proxy 40 to the server side proxy 30, and the FP compression is used in the transfer of the reply message from the server side proxy 30 to the client side proxy 40.

In the following, the request source client side proxy is a client side proxy corresponding to a request source client in the processing of a pair of a request message and a reply message, i.e., a client side proxy which is a source of a request message and a destination of a reply message.

When the request message is received from one client side proxy (i.e., the request source client side proxy) 40 among a plurality of client side proxies (step S1), the server side proxy 30 transmits it to the server 20 which is a destination (step S2). At this point, the processing for this pair of the request message and the reply message once enters a state waiting for the receiving of the corresponding reply message.

Then, when the server side proxy 30 receives the reply message from the server 20 at the reception unit 31 (step S3), the FP compression judgement unit 321 checks and judges whether the reply data of this reply message is a target for applying the FP compression or not (step S4). When the reply data is judged as not a target for applying the FP compression (step S4 NO), the received reply message is transferred to the client side proxy 40 from the transmission unit 33 (step S9).

When the reply data of this reply message is judged as a target for applying the FP compression at the step S4, the fingerprint value of this reply data is calculated at the FP cache management unit 322 (step S5), and the fingerprint cache 34 corresponding to the request source client side proxy 40 is searched through by using this fingerprint value as a key (step S6).

When a set of this fingerprint value and the corresponding data is registered in the fingerprint cache 34 corresponding to that request source client side proxy 40 (step S7 YES), the received reply message is converted into the FP compression format (of FIG. 9B, for example) by using this fingerprint value at the FP compression processing unit 323, and transmitted to that request source client side proxy 40 from the transmission unit 33 (step S8). At this point, a value of a field indicating the data length (Content-Length field) in the reply header is set in accordance with the FP compression format, according to the need.

On the other hand, when a set of this fingerprint value and the corresponding data is not registered in the fingerprint cache 34 corresponding to that request source client side proxy 40 as a result of the search of the step S6 (step S7 NO), the following two operations are carried out.

(1) The received reply message is converted into a non-FP compression format (of FIG. 9A, for example) (by using this fingerprint value according to the need) at the FP compression processing unit 323, and transmitted to the client side proxy 40 from the transmission unit 33 (step S10).

(2) This fingerprint value and this reply data are set in correspondence (the fingerprint value is set as a key) and registered into the fingerprint cache 34 corresponding to that request source client side proxy 40 at the FP cache management unit 322 (step S11).

Note that these operations (1) and (2) can be carried out in any desired order or in parallel.

Figure 19:
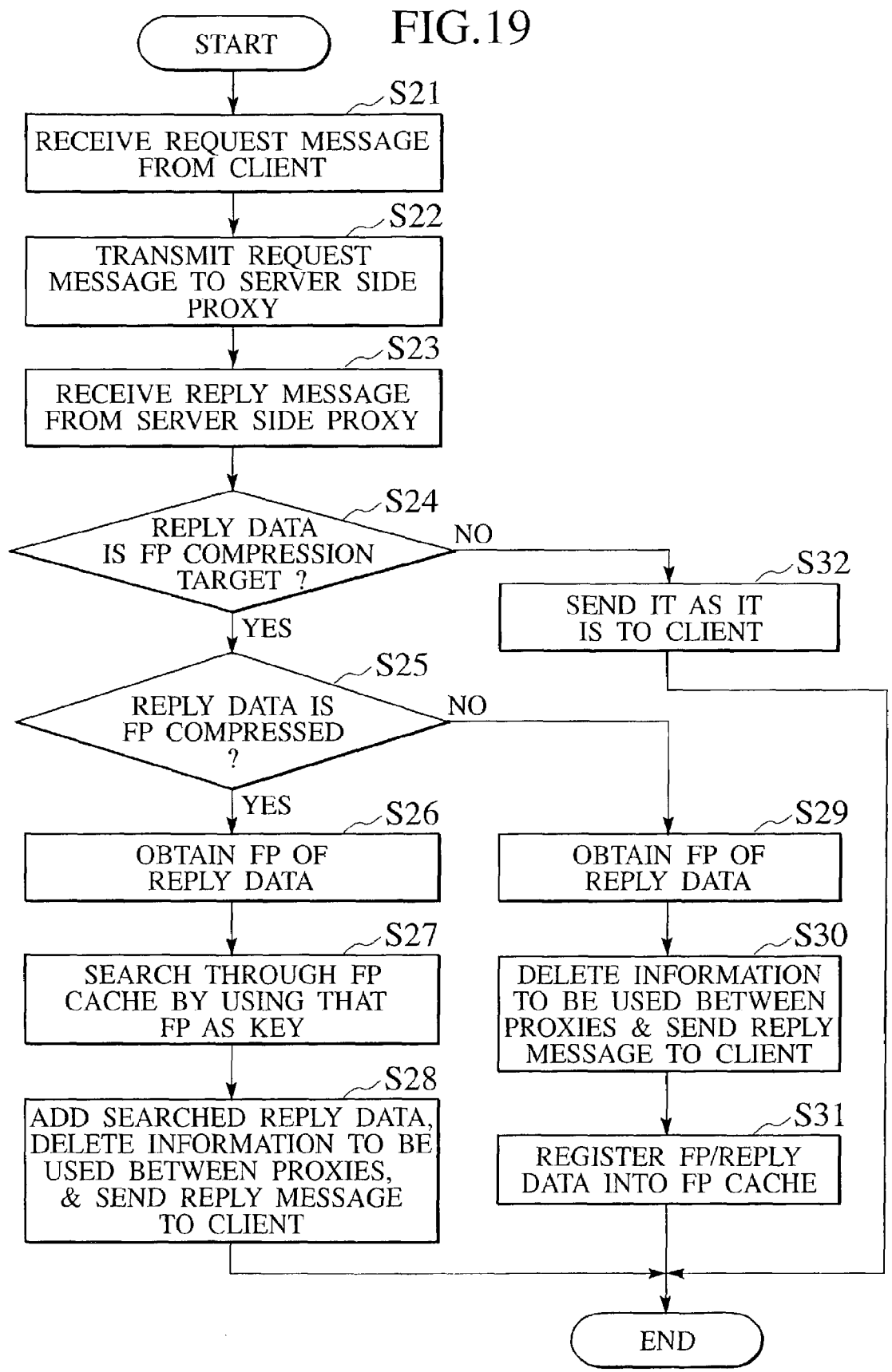
FIG. 19 is a flow chart showing one exemplary processing procedure of the client side proxy of FIG. 13 according to one embodiment of the present invention.

FIG. 19 shows an exemplary processing procedure of the client side proxy 40 since receiving the request message from the client 50 until transferring the reply message to that client 50.

Note that FIG. 19 shows the processing of the client side proxy 40 in the case of receiving one request message from the client 50, but when the request messages are received simultaneously from a plurality of clients 50, the processing of FIG. 19 is carried out in parallel when each request is received.

Note also that FIG. 19 is an exemplary procedure for the case where the FP compression is not used in the transfer of the request message from the client side proxy 40 to the server side proxy 30, and the FP compression is used in the transfer of the reply message from the server side proxy 30 to the client side proxy 40.

When the request message is received from the request source client 50 (step S21), the client side proxy 40 transmits it to the server side proxy 30 corresponding to the server 20 which is a destination (step S22). At this point, the processing for this pair of the request message and the reply message once enters a state waiting for the receiving of the corresponding reply message.

Then, when the client side proxy 40 receives the reply message from the server side proxy 30 at the reception unit 41 (step S23), the FP compression judgement unit 421 checks and judges whether the reply data of this reply message is a target for applying the FP compression or not (step S24). When the reply data is judged as not a target for applying the FP compression (step S24 NO), the received reply message is transferred to the client 50 from the transmission unit 43 (step S32).

When the reply data of this reply message is judged as a target for applying the FP compression at the step S24, the FP compression judgement unit 421 also checks and judges whether the reply data is FP compressed or not (step S25).

When the reply data of this reply message is judged as FP compressed (as shown in FIG. 9B, for example) at the step S25, the fingerprint value of this reply data is obtained at the FP cache management unit 422 (step S26), and the fingerprint cache 44 is searched through by using this fingerprint value as a key (step S27).

Then, the data corresponding to this fingerprint value obtained from the fingerprint cache 44 is attached to the received reply message and a special information to be used between the proxies is deleted in the case of using such an information at the FP decompression processing unit 423, and the resulting reply message is transmitted to the client 50 from the transmission unit 43 (step S28). At this point, a value of a field indicating the data length (Content-Length field) in the reply header is set to be a length of the data corresponding to this fingerprint value, according to the need.

On the other hand, when the reply data of this reply message is judged as not FP compressed (as shown in FIG. 9A, for example) at the step S25, the following two operations are carried out.

(1) The special information to be used between the proxies is deleted from the received reply message in the case of using such an information at the FP decompression processing unit 423, and the resulting reply message is transmitted to the client 50 from the transmission unit 43 (step S30).

(2) The fingerprint value of this reply data is obtained (step S29), and this fingerprint value and this reply data are set in correspondence (the fingerprint value is set as a key) and registered into the fingerprint cache 44 at the FP cache management unit 422 (step S31).

Note that these operations (1) and (2) can be carried out in any desired order or in parallel.

Here, the fingerprint value can be obtained at the step S26 from the fingerprint that is described in the message. However, the step S29 can use a method for obtaining the fingerprint from the message when the fingerprint is described in the message or a method for calculating the fingerprint value by using the hash function or the like from the reply data when the fingerprint is not described in the message. It is also possible to use a method for calculating the fingerprint value from the reply data even when the fingerprint is described in the message.

Note also that it is possible to carry out the step S26 or the step S29 between the step S24 and the step S25, and it is also possible to carry out the step S29 between the step S30 and the step S31. Note also that the judgement of the step S24 and the judgement of the step S25 can be made simultaneously.

Next, with reference to FIG. 20, the operation in the case of transferring data that is not registered in the fingerprint cache from the server side proxy 30 to the client side proxy 40 while registering this data into the fingerprint cache will be described.

(1) Suppose that the browser or the like on the client 50 issued the request message of the POST method to the server 20 by using the URL of "/A.cgi", for example. Here, the browser or the like is set in advance to send the request message for the server 20 to the client side proxy 40 first.

(2), (3) This request message is transferred to the server 20 by the client side proxy 40 and the server side proxy 30 corresponding to the server 20 which is a destination.

(4) The server 20 carries out a processing with respect to this request message, and then returns the reply message to the server side proxy 30.

(5), (6) The server side proxy 30 registers the reply data of the received reply message into the fingerprint cache 34 corresponding to the request source client side proxy 40 as this reply data is data received for the first time for the request source client side proxy 40, and transfers this reply message to that client side proxy 40.

(7), (8) The client side proxy 40 obtains the fingerprint according the reply data of the received reply message and registers the fingerprint along with that reply data into the fingerprint cache 44 as this reply data is data received for the first time, and transfers this reply message to (the browser or the like operating on) the request source client 50.

Next, with reference to FIG. 21, the operation in the case of transferring data that is registered in the fingerprint cache by the operation of FIG. 20 from the server side proxy 30 to the client side proxy 40 will be described.

Figure 20:
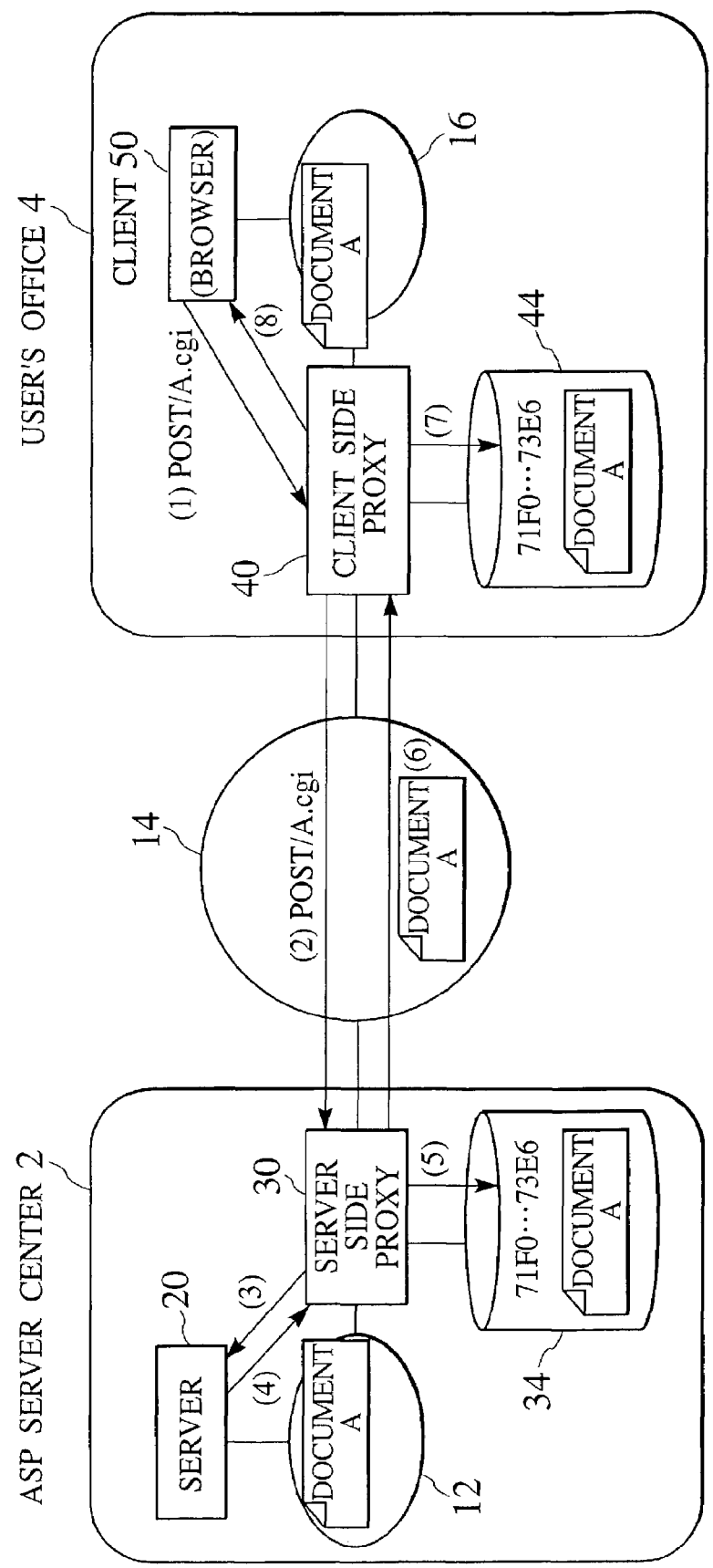
FIG. 20 is a diagram for explaining one exemplary data transfer between the server side proxy of FIG. 12 and the client side proxy of FIG. 13 according to one embodiment of the present invention.
Figure 21:
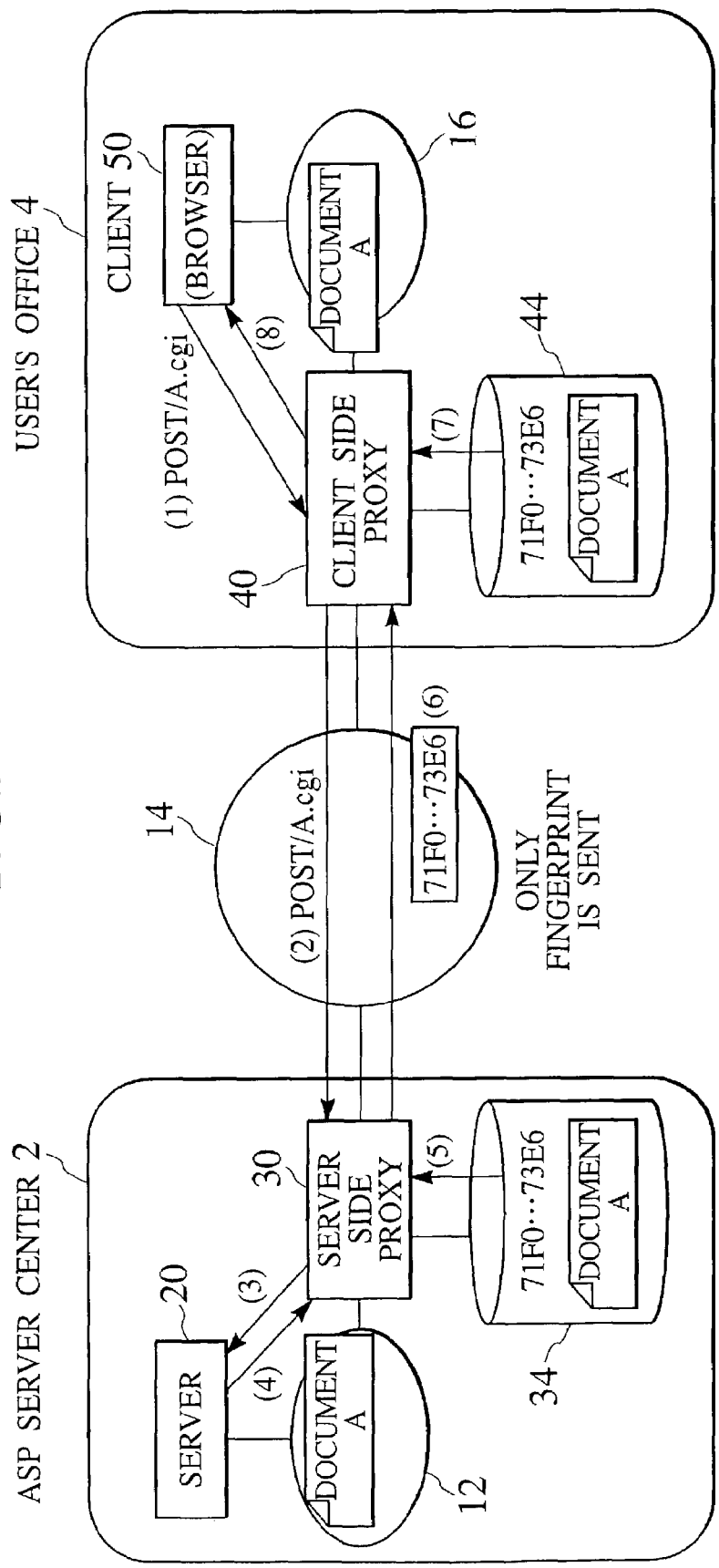
FIG. 21 is a diagram for explaining another exemplary data transfer between the server side proxy of FIG. 12 and the client side proxy of FIG. 13 according to one embodiment of the present invention.

(1) to (4) are the same as (1) to (4) in the operation of FIG. 20.

(5), (6) The server side proxy 30 replaces the reply data of the reply message received from the server 20 with the corresponding fingerprint registered in the fingerprint cache 34 corresponding to the request source client side proxy 40, and transfers the resulting reply message to the client side proxy 40.

(7), (8) The client side proxy 40 detects that the reply data of the reply message is replaced with the fingerprint, takes out the corresponding data from the fingerprint cache 44 by using the specified fingerprint, enters this data into the reply body, and transfers that reply message to (the browser or the like operating on) the request source client 50.

Now, up to this point, the case of handling the reply message transferred from the server side proxy to the client side proxy has been mainly described, but of course the present invention is applicable to the other messages as well.

Also, up to this point, at a time of transferring the data from the server side proxy 30 to the client side proxy 40, if this data is the same as that registered in the fingerprint cache, the network traffic is reduced by transferring the corresponding fingerprint instead of this data. This FP compression can be applied also to the case of transferring the request data or the like from the client side proxy 40 to the server side proxy 30 as well.

Also, up to this point, the embodiment in which the entire data contained in one message is a target for applying the FP compression (a target for the registration into the fingerprint cache) has been described, but in the case where the data contained in one message is formed by a set of prescribed unit data, for example, it is also possible to set only a part of the unit data contained in one message as a target for applying the FP compression (a target for the registration into the fingerprint cache).

Referring now to FIG. 23 to FIG. 31, another embodiment of the data transfer scheme according to the present invention will be described in detail. In the following, the differences from the previous embodiment will be mainly described.

Figure 23:
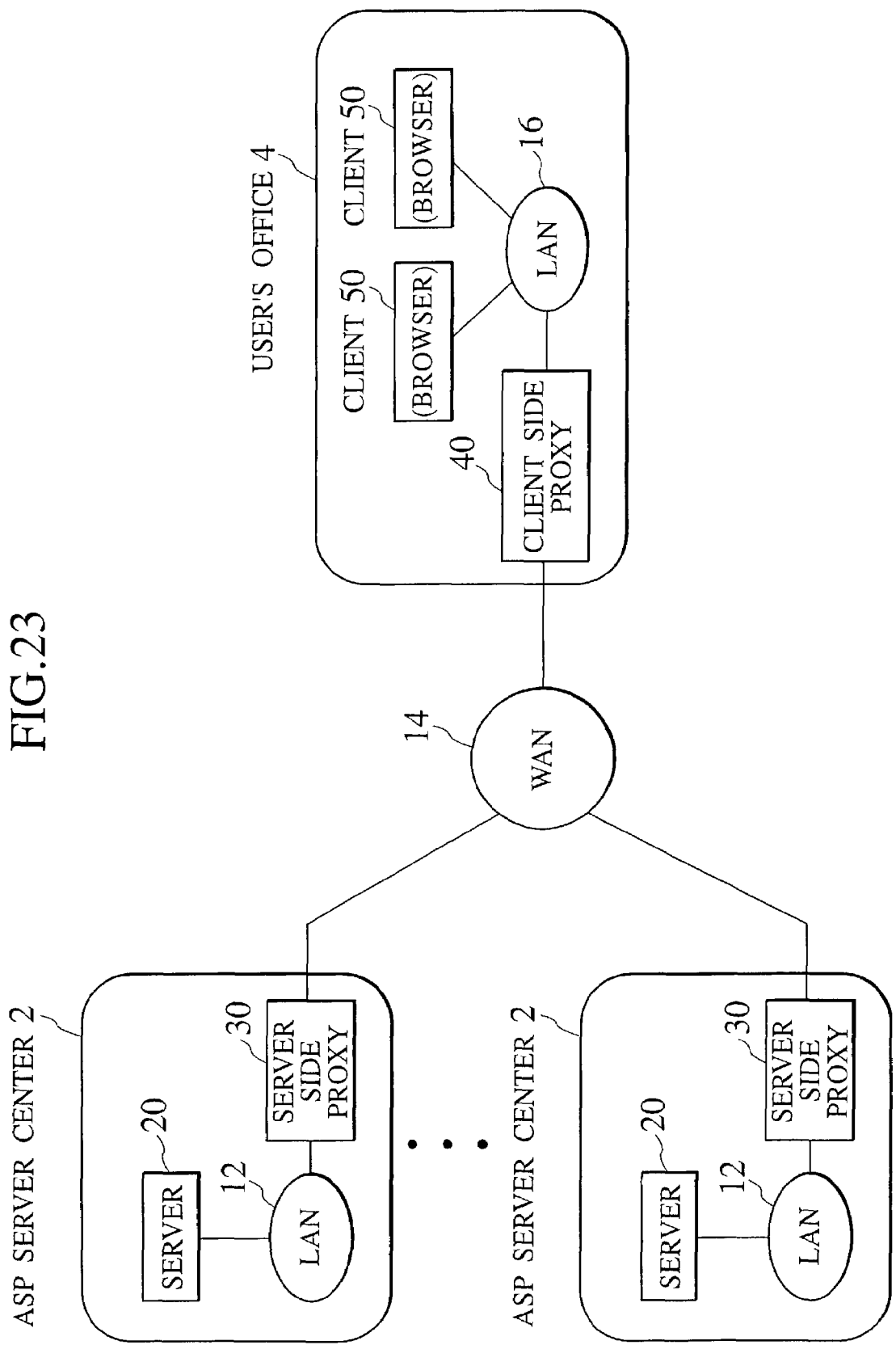
FIG. 23 is a diagram showing one exemplary configuration of a computer network system according to another embodiment of the present invention.

In this embodiment, as shown in FIG. 23, two modules called a server side proxy 30 and a client side proxy 40 are provided at two ends of the WAN 14 that are connecting between the LANs 12 inside the ASP server centers 2 and the LAN 16 inside the user's office 4 and the fingerprint compression (FP compression) is carried out between them, such that the amount of communication data is reduced and the bottleneck of the wide area network is resolved, similarly as in the previous embodiment.

Note here that the following description is directed to the case of applying the FP compression to communications between a plurality of server side proxies 30 and one client side proxy 40 (the case where one server side proxy 30 carries out a communication to which the FP compression is applied, with one client side proxy 40 at a given timing).

Figure 24:
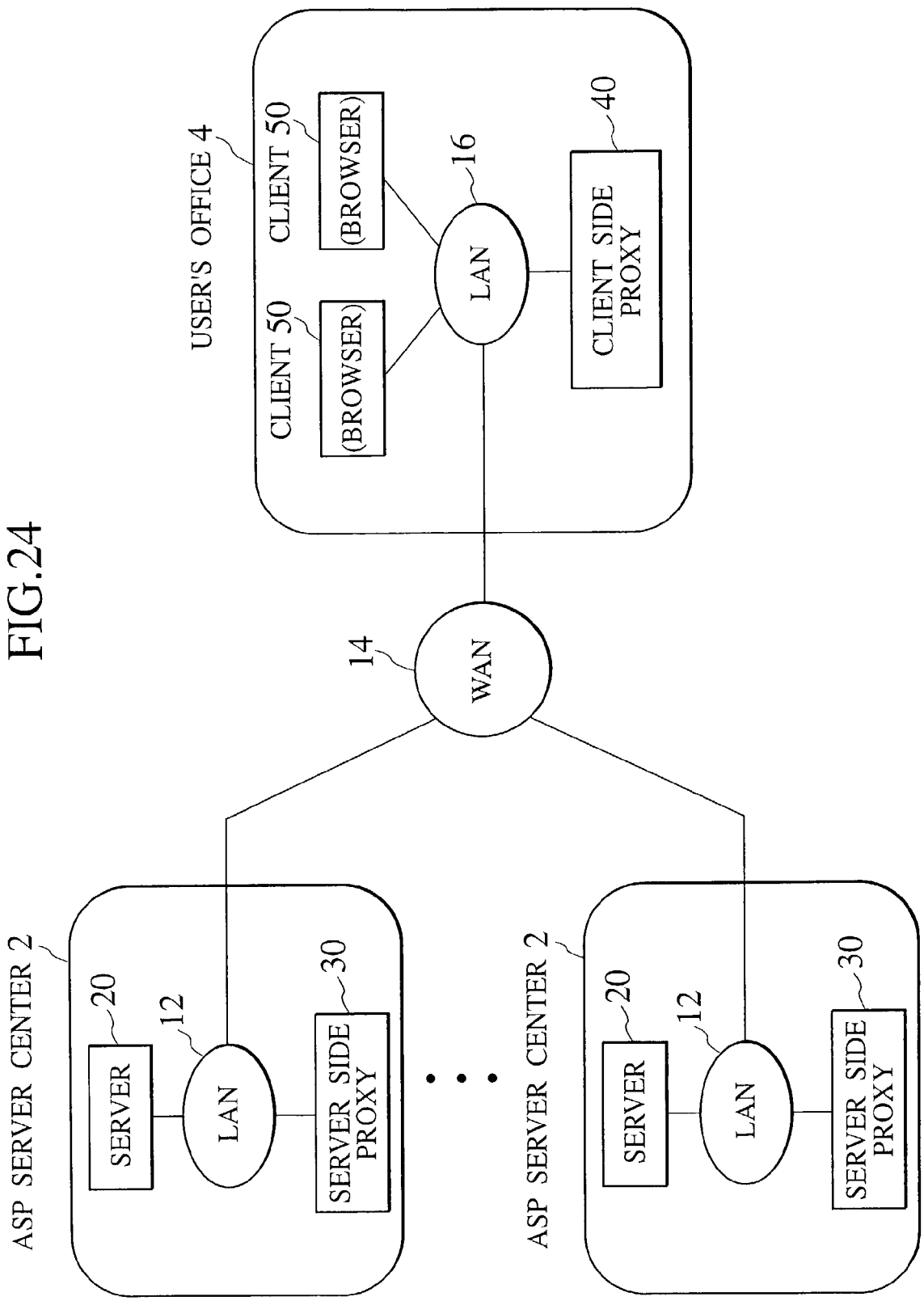
FIG. 24 is a diagram showing another exemplary configuration of a computer network system according to another embodiment of the present invention.

The server side proxy 30 can be provided to operate as a transparent proxy by being connected with both the LAN 12 inside the ASP server center 12 and the WAN 14 as shown in FIG. 23. The server side proxy 30 can also be provided on the LAN 12 inside the ASP server center 12 as shown in FIG. 24. The server side proxy 30 can also be realized as a built-in function of the server 20 as shown in FIG. 25.

Similarly, the client side proxy 40 can be provided to operate as a transparent proxy by being connected with both the LAN 16 inside the user's office 4 and the WAN 14 as shown in FIG. 23. The client side proxy 40 can also be provided on the LAN 16 inside the user's office 16 as shown in FIG. 24. The client side proxy 40 can also be realized as a built-in function of the browser or the like that operates on the client 50 as shown in FIG. 25. The client side proxy 40 can also be realized as a personal client side proxy that is operated on the client 50 on which the browser or the like is operated.

Figure 25:
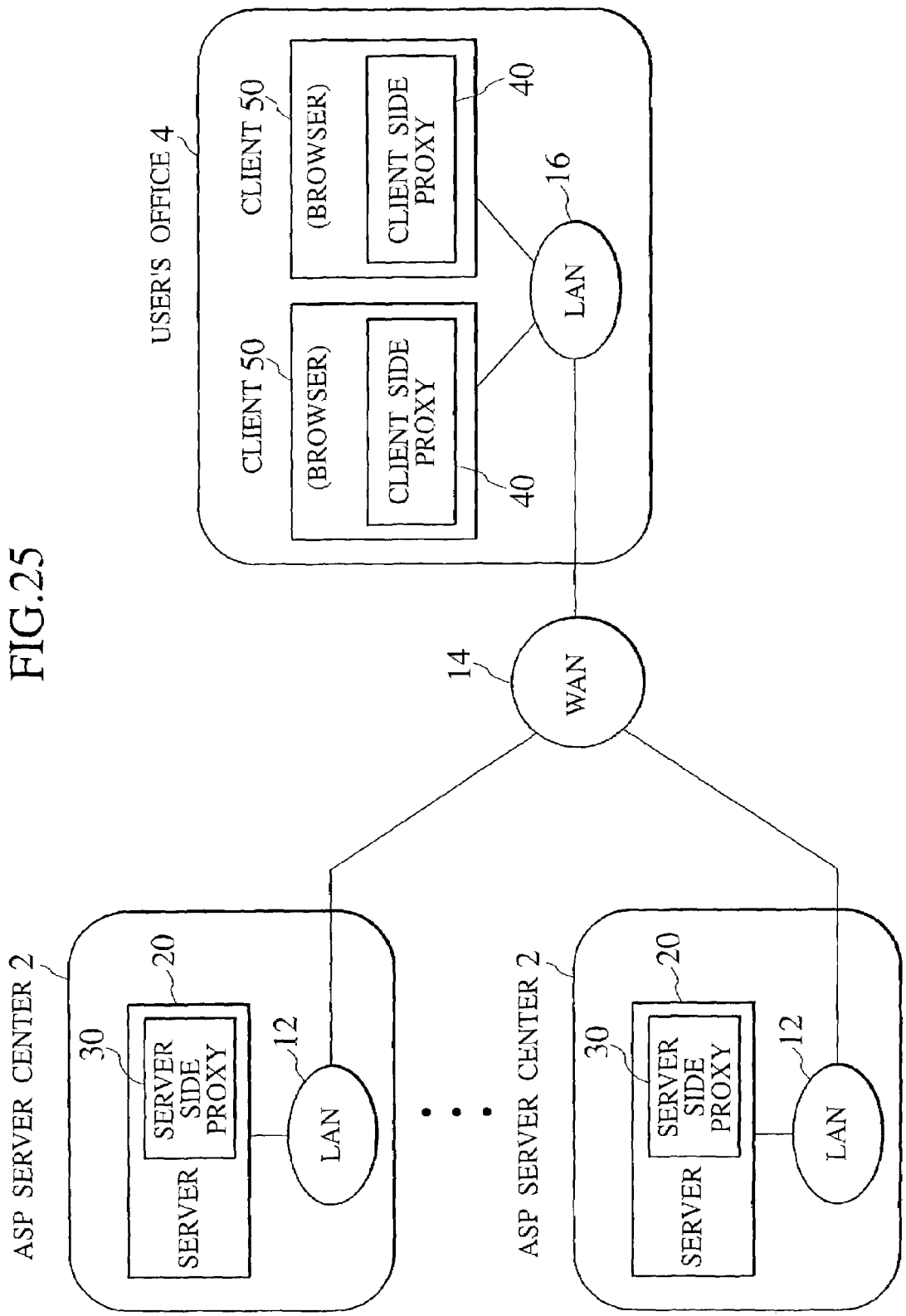
FIG. 25 is a diagram showing another exemplary configuration of a computer network system according to another embodiment of the present invention.

Note that the server side proxy 30 and the client side proxy 40 can be provided in the same form as shown in FIGS. 23 to 25. They can also be provided in different forms, such that some server side proxy 30 is provided in a form of FIG. 23, some other server proxy 30 is provided in a form of FIG. 24, some client side proxy 40 is provided in a form of FIG. 23, and some other slide side proxy 40 is provided in a form of FIG. 25, for instance.

Also, the client side proxy 40 may be provided in a form of a built-in element of a mobile terminal or a mobile computer, as shown in FIG. 4 described above, for example.

Each one of the server side proxy 30 and the client side proxy 40 of this embodiment has the caching mechanism called fingerprint cache (FP cache), similarly as in the previous embodiment.

Figure 26:
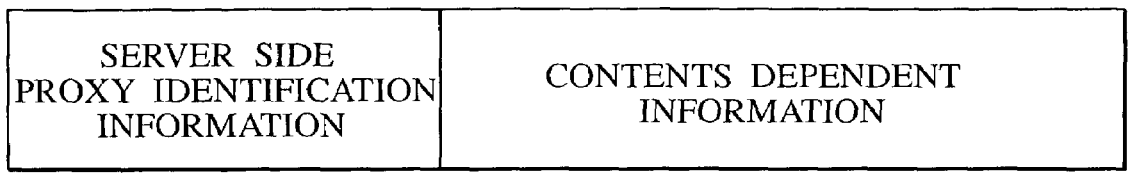
FIG. 26 is a diagram for explaining a fingerprint to be used in another embodiment of the present invention.

FIG. 26 shows an exemplary data structure of the fingerprint to be exchanged between the server side proxy 30 and the client side proxy 40 in this embodiment. In this case, the fingerprint contains a portion (server side proxy identification information) formed by a server side proxy identification information of the server side proxy 30 which issues this fingerprint and a portion (contents dependent information) formed by information obtained according to the content of the data.

The server side proxy identification information is information capable of uniquely identifying the server side proxy 30, which can be given by an IP address, a MAC address, a host ID, etc., for example.

The contents dependent information is information dependent on the content of the data, which can be a value obtained as a hash value from the contents as will be described below, for example.

By including the server side proxy identification information in the fingerprint, the different server side proxies will have different fingerprints even when the contents dependent information is the same, so that it is possible to avoid having the identical name for different data contents and it becomes possible to maintain the consistency in the correspondence between the data and the name.

The contents dependent information of the fingerprint of FIG. 26 is a numerical value similar to the fingerprint of the previous embodiment, and can be calculated by the similar method as described above.

As in FIG. 6 described above, the fingerprint cache 60 to be provided in the server side proxy 30 is recording and managing the data body 61 that were exchanged by using the HTTP protocol in the past, by using the fingerprint value 62 formed by a value of the server side proxy identification information of this server side proxy 30 and a value of the contents dependent information calculated from that data body 61 as its name. On the other hand, the fingerprint cache to be provided in the client side proxy 40 has a format similar to the fingerprint cache of the server side proxy 30, except that a portion of the server side proxy identification information of the fingerprint will describe the server side proxy identification information of the server side proxy 30 that is a correspondent. Note however that the client side proxy 40 need not be particularly conscious of the server side proxy identification information at a time of replacing the fingerprint given from the server side proxy 30 with the original data.

For example, when the data are to be transferred from the server side proxy 30 to the client side proxy 40 by using the HTTP protocol, the server side proxy 30 calculates the contents dependent information of the fingerprint of that data, and if the data corresponding to that fingerprint formed by the own server side proxy identification information and that contents dependent information exists in the fingerprint cache, it implies that (data with the same content as) this data had been transferred to that client side proxy 40 in the past, so that the server side proxy 30 transfers the corresponding fingerprint value without transferring that data itself. The client side proxy 40 that received the fingerprint can reproduce the data to be transferred by taking out the data corresponding to that fingerprint value from the fingerprint cache. In this scheme (i.e., the sequence of data compression→data transfer→data decompression), it is possible to reduce the amount of data to be transferred through the network considerably because it suffices to send the fingerprint values for those data that are the same as the data already sent in the past.

Note that the client side proxy 40 can be provided in a configuration which uses the fingerprint that is described in a message from the server side proxy 30 at a time of the registration, a configuration which calculates the fingerprint itself as the fingerprint is not to be described in a message from the server side proxy 30, or a configuration which calculates the fingerprint itself even though the fingerprint is described in a message from the server side proxy 30. In the configuration for calculating the fingerprint itself at a time of the registration, the server side proxy identification information of the server side proxy 30 which is a correspondent is obtained while the contents dependent information is obtained from that data, and the fingerprint is generated from them. Here, the server side proxy identification information can be identified from information (such as IP address, for example) of the request transfer target proxy at a time of the request message transmission, for example.

Note also that the message format to be used between proxies (for a message that is a target for applying the FP compression) at a time of the data transfer between the server side proxy 30 and the client side proxy 40 can be the same as those shown in FIGS. 7A, 7B, 8, 9A, 9B, 10A, 10B and 11 described above.

In these exemplary formats, when a source information (such as IP address, for example) that already exists in the header of the reply data can be utilized as the server side proxy identification information, it is also possible to use a format for describing only the contents dependent information in the fingerprint portion, where the fingerprint is obtained at the client side proxy by combining the server side proxy identification information and the contents dependent information.

In this embodiment, an exemplary configuration of the server side proxy 30 is similar to that of FIG. 12 described above, except that only one FP cache 34 is provided, and an exemplary configuration of the client side proxy 40 is similar to that of FIG. 13 described above.

Figure 27:
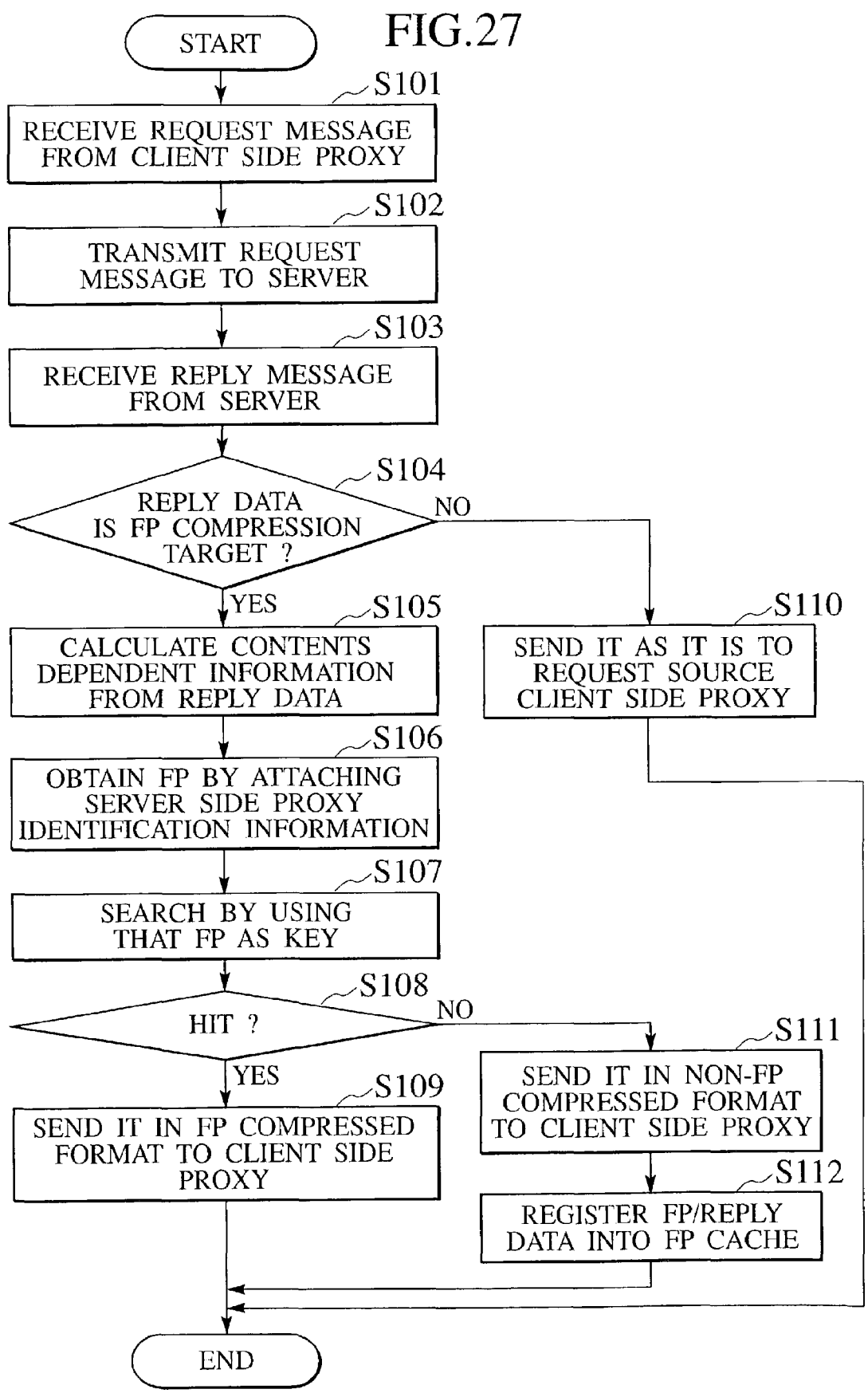
FIG. 27 is a flow chart showing one exemplary processing procedure of the server side proxy according to another embodiment of the present invention.

FIG. 27 shows an exemplary processing procedure of the server side proxy 30 since receiving the request message from the client side proxy 40 until transferring the reply message to that client side proxy 40 in this embodiment.

Note that FIG. 27 shows the processing of the server side proxy 30 in the case of receiving one request message from the client side proxy 40, but when the request messages are received simultaneously from a plurality of client side proxies 40, the processing of FIG. 27 is carried out in parallel when each request is received.

Note also that FIG. 27 is an exemplary procedure for the case where the FP compression is not used in the transfer of the request message from the client side proxy 40 to the server side proxy 30, and the FP compression is used in the transfer of the reply message from the server side proxy 30 to the client side proxy 40.

When the request message is received from the client side proxy 40 corresponding to the request source client 50 (step S101), the server side proxy 30 transmits it to the server 20 which is a destination (step S102). At this point, the processing for this pair of the request message and the reply message once enters a state waiting for the receiving of the corresponding reply message.

Then, when the server side proxy 30 receives the reply message from the server 20 at the reception unit 31 (step S103), the FP compression judgement unit 321 checks and judges whether the reply data of this reply message is a target for applying the FP compression or not (step S104). When the reply data is judged as not a target for applying the FP compression (step S104 NO), the received reply message is transferred to the client side proxy 40 from the transmission unit 33 (step S110).

When the reply data of this reply message is judged as a target for applying the FP compression at the step S104, at the FP cache management unit 322, the contents dependent information value of the fingerprint of this reply data is calculated (step S105) and the fingerprint is obtained by attaching the own server side proxy identification information to that contents dependent information (step S106). Then, the fingerprint cache 34 is searched through by using this fingerprint value as a key (step S107).

When a set of this fingerprint value and the corresponding data is registered in the fingerprint cache 34 (step S108 YES), the received reply message is converted into the FP compression format (of FIG. 9B, for example) by using this fingerprint value at the FP compression processing unit 323, and transmitted to that request source client side proxy 40 from the transmission unit 33 (step S109). At this point, a value of a field indicating the data length (Content-Length field) in the reply header is set in accordance with the FP compression format, according to the need.

On the other hand, when a set of this fingerprint value and the corresponding data is not registered in the fingerprint cache 34 as a result of the search of the step S107 (step S108 NO), the following two operations are carried out.

(1) The received reply message is converted into a non-FP compression format (of FIG. 9A, for example) (by using this fingerprint value according to the need) at the FP compression processing unit 323, and transmitted to the client side proxy 40 from the transmission unit 33 (step Sill).

(2) This fingerprint value and this reply data are set in correspondence (the fingerprint value is set as a key) and registered into the fingerprint cache 34 at the FP cache management unit 322 (step S112).

Note that these operations (1) and (2) can be carried out in any desired order or in parallel.

In this embodiment, an exemplary processing procedure of the client side proxy 40 since receiving the request message from the client 50 until transferring the reply message to that client 50 can be carried out similarly as that of FIG. 19 described above.

Also, in this embodiment, the operation in the case of transferring data that is not registered in the fingerprint cache from the server side proxy 30 to the client side proxy 40 while registering this data into the fingerprint cache can be carried out according to FIG. 20 described above, as follows.

(1) Suppose that the browser or the like on the client 50 issued the request message of the POST method to the server 20 by using the URL of "/A.cgi", for example. Here, the browser or the like is set in advance to send the request message for the server 20 to the client side proxy 40 first.

(2), (3) This request message is transferred to the server 20 by the client side proxy 40 and the server side proxy 30 corresponding to the server 20 which is a destination.

(4) The server 20 carries out a processing with respect to this request message, and then returns the reply message to the server side proxy 30.

(5), (6) The server side proxy 30 registers the reply data of the received reply message into the fingerprint cache 34 as this reply data is data received for the first time, and transfers this reply message to that client side proxy 40 corresponding to the request source client 50.

(7), (8) The client side proxy 40 obtains the fingerprint according the reply data of the received reply message and registers the fingerprint along with that reply data into the fingerprint cache 44 as this reply data is data received for the first time, and transfers this reply message to (the browser or the like operating on) the request source client 50.

Also, in this embodiment, the operation in the case of transferring data that is registered in the fingerprint cache by the operation of FIG. 20 from the server side proxy 30 to the client side proxy 40 can be carried out according to FIG. 21 described above, as follows.

(1) to (4) are the same as (1) to (4) in the operation of FIG. 20.

(5), (6) The server side proxy 30 replaces the reply data of the reply message received from the server 20 with the fingerprint, and transfers the resulting reply message to the client side proxy 40 corresponding to the request source client 50.

(7), (8) The client side proxy 40 detects that the reply data of the reply message is replaced with the fingerprint, takes out the corresponding data from the fingerprint cache 44 by using the specified fingerprint, enters this data into the reply body, and transfers that reply message to (the browser or the like operating on) the request source client 50.

Now, up to this point, the case of multiple-to-one communications between a plurality of server side proxies and one client side proxy has been described, but the present invention is also applicable to the system using multiple-to-multiple communications between the server side proxies and the client side proxies. In the following, such a system using multiple-to-multiple communications between server side proxies and the client side proxies will be described. Note that, in the following, the differences from the above described embodiment will be mainly described.

Figure 28:
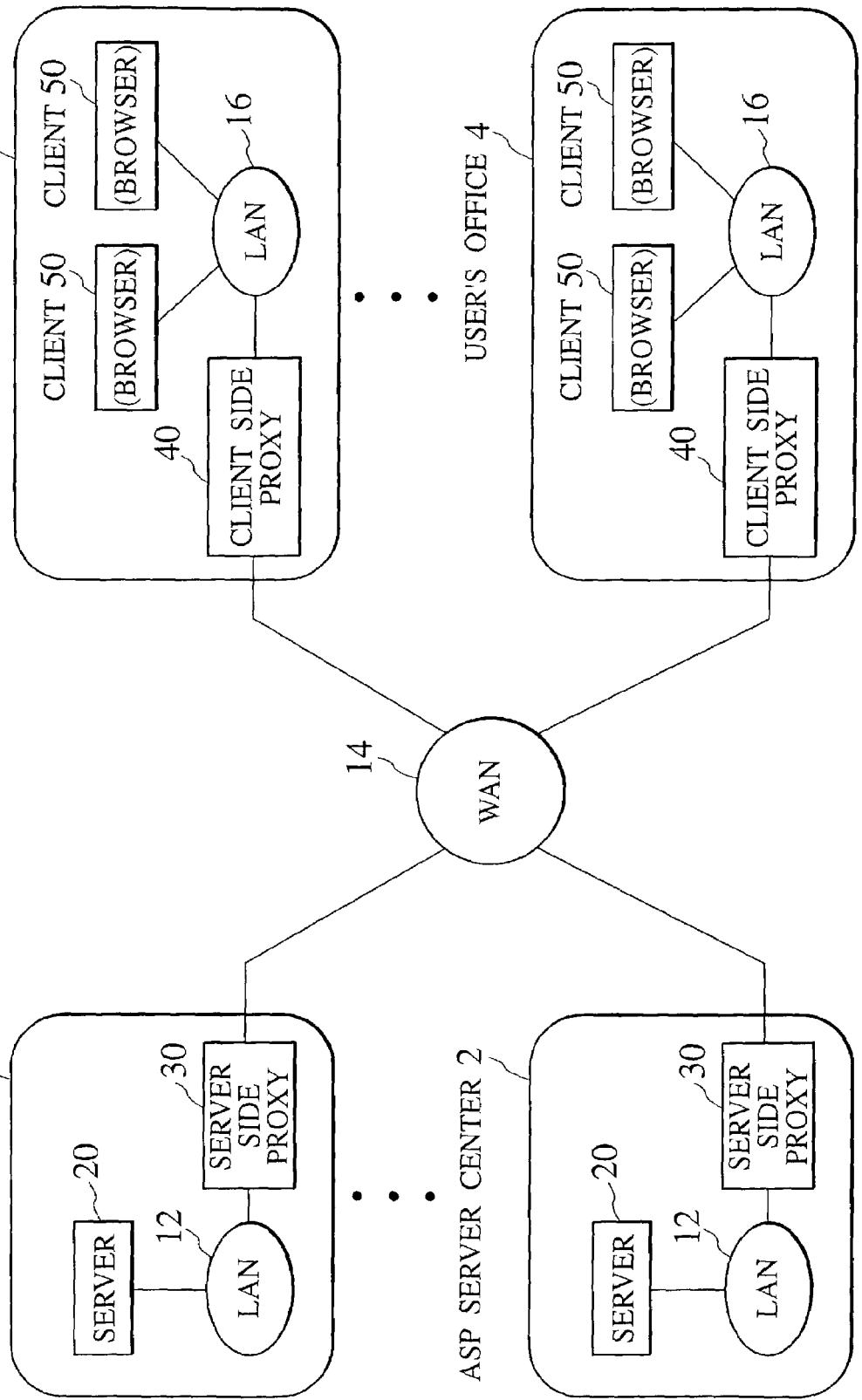
FIG. 28 is a diagram showing another exemplary configuration of a computer network system according to another embodiment of the present invention.
Figure 29:
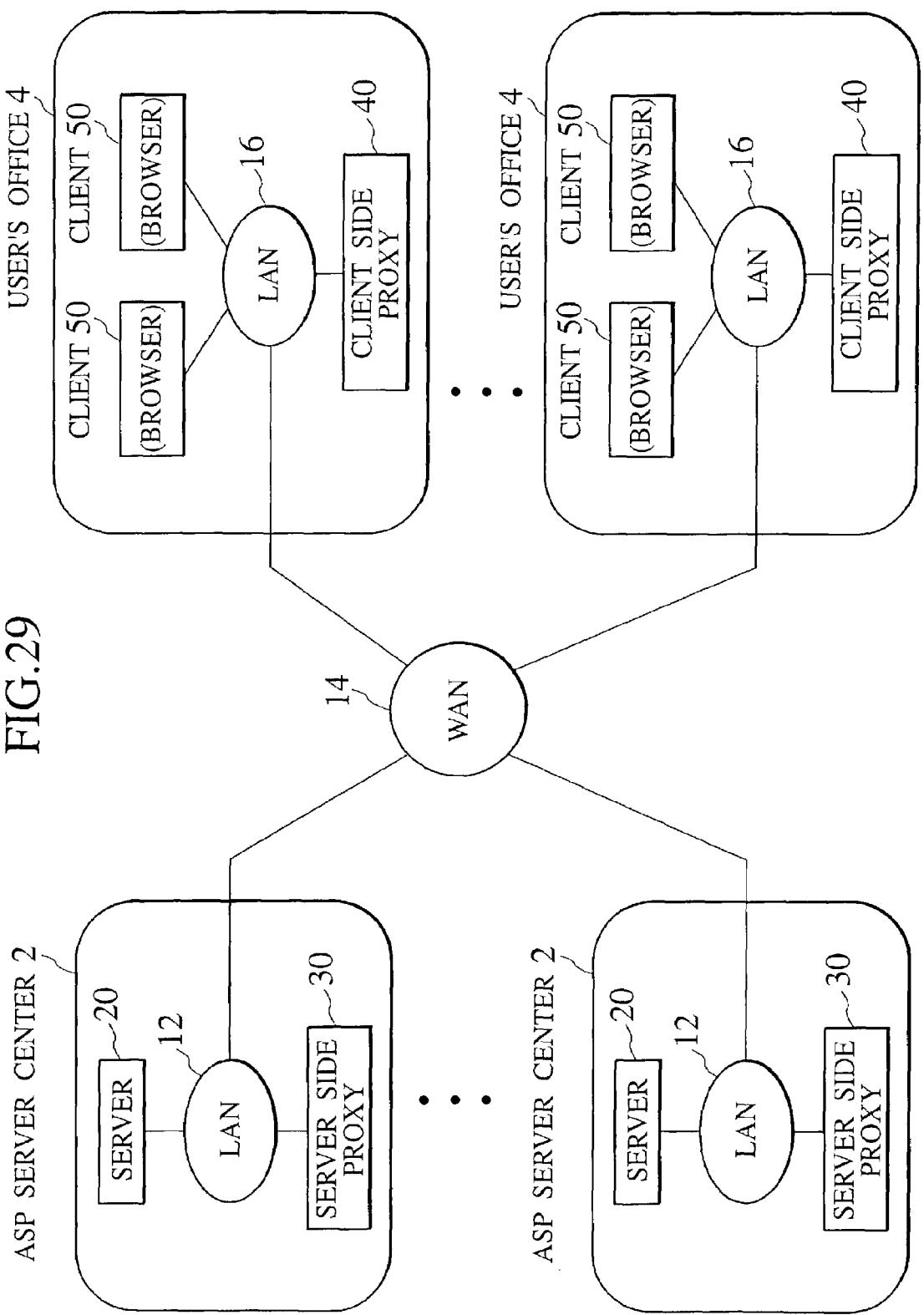
FIG. 29 is a diagram showing another exemplary configuration of a computer network system according to another embodiment of the present invention.
Figure 30:
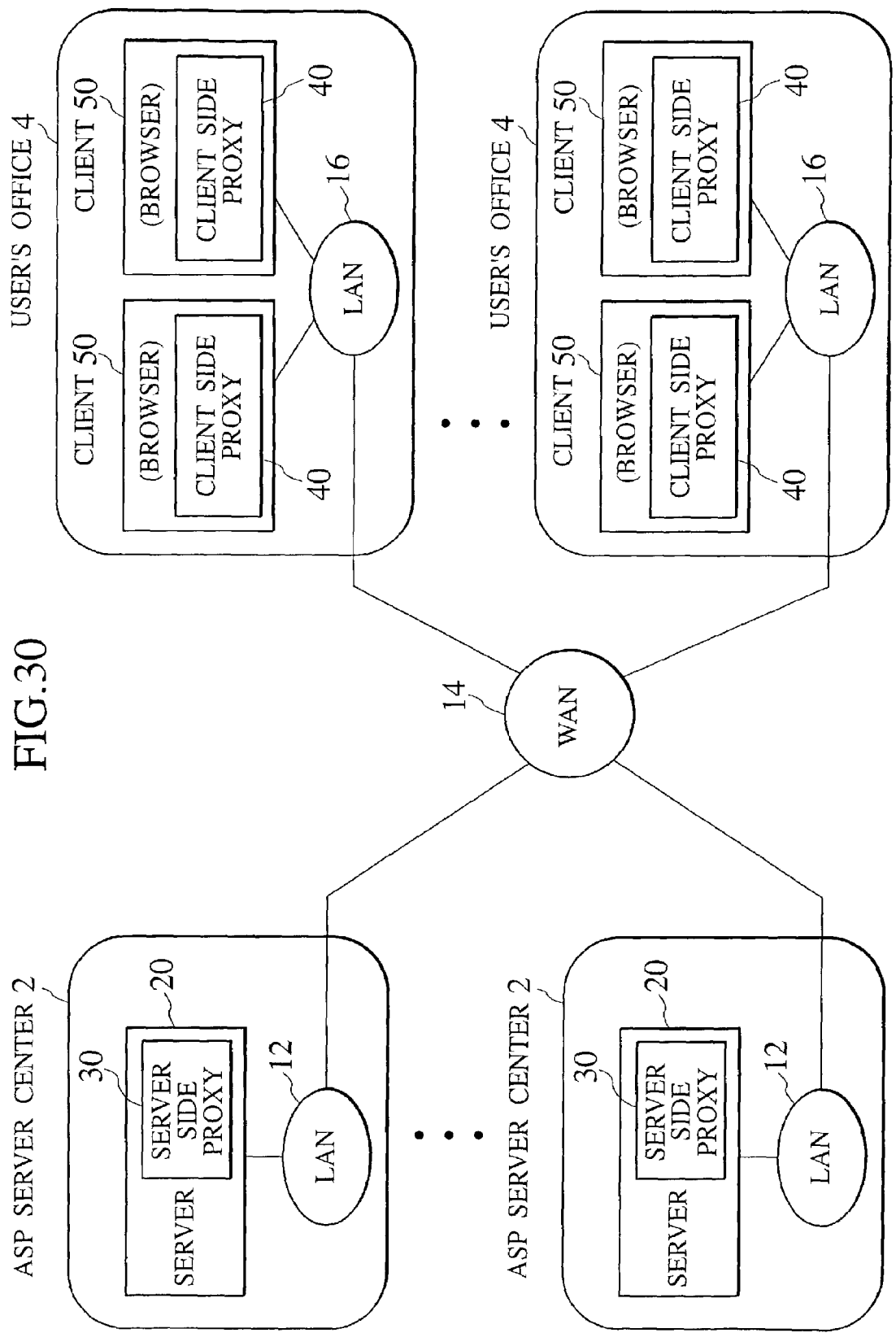
FIG. 30 is a diagram showing another exemplary configuration of a computer network system according to another embodiment of the present invention.

FIGS. 28, 29 and 30 show exemplary configurations of a computer network system in this case, corresponding to FIGS. 23, 24 and 25 described above, respectively.

The basic functions of the server 20, the server side proxy 30, the client side proxy 40, and the client 50 are the same as the above described embodiment.

Similarly as in the above described embodiment, the server side proxy 30 and the client side proxy 40 can be provided in the same form as shown in FIGS. 28 to 30, for example, or in different forms. Also, the client side proxy 40 may be provided in a form of a built-in element of a mobile terminal or a mobile computer, as shown in FIG. 4 described above, for example.

In the following, the configuration and the operation of the server side proxy 30 in this case will be described. Note that an exemplary configuration of the client side proxy 40 is basically the same as that of FIG. 13 described above. Also, an exemplary processing procedure of the client side proxy 40 at a time of transferring the reply message from the server side proxy 30 to the client side proxy 40 is basically the same as that of FIG. 19 described above.

An exemplary configuration of the server side proxy 30 is similar to that of FIG. 12 described above, which is provided with a function for managing the correspondence between the fingerprint and the data for each client side proxy 40 which is a correspondent of the communications to which the FP compression is to be applied.

For example, when the FP compression target data are to be transferred from the server side proxy 30 to the client side proxy 40 by using the HTTP protocol, the server side proxy 30 obtains the fingerprint (the own server side proxy identification information and the contents dependent information corresponding to that data) of that data, and if the data corresponding to that fingerprint exists in the fingerprint cache corresponding to that client side proxy 40, it implies that (data with the same content as) this data had been transferred to that client side proxy 40 in the past, so that the server side proxy 30 transfers the corresponding fingerprint value without transferring that data itself. On the other hand, if the data corresponding to that fingerprint does not exist in the fingerprint cache corresponding to that client side proxy 40, it implies that (data with the same content as) this data had not been transferred to that client side proxy 40 in the past, so that the server side proxy 30 transfers that data, while carrying out the registration to the fingerprint cache corresponding to that client side proxy 40.

Note that the server side proxy 30 can identify the client side proxy 40 to which the data received from the server 20 should be transferred, according to a prescribed communication regulation, for example.

Similarly as in the above described embodiment, the FP cache management unit 322 manages a correspondence between the fingerprint and the data for each client side proxy 40 which is a correspondent of a communication to which the FP compression is to be applied, by using various forms such as those shown in FIGS. 14 to 17 described above.

Figure 31:
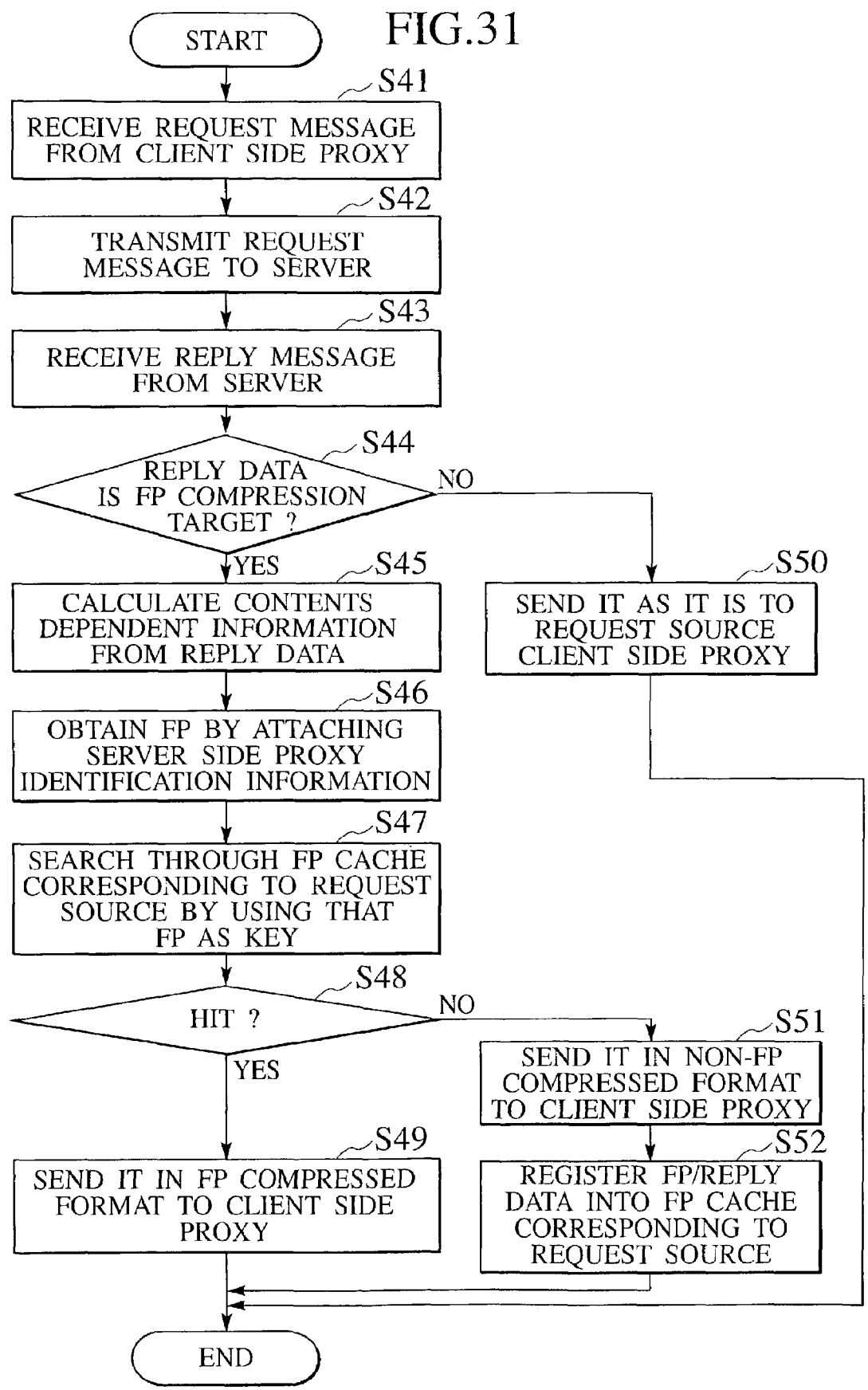
FIG. 31 is a flow chart showing another exemplary processing procedure of the server side proxy according to another embodiment of the present invention.

FIG. 31 shows an exemplary processing procedure of the server side proxy 30 since receiving the request message from the client side proxy 40 until transferring the reply message to that client side proxy 40.

Note that FIG. 31 shows the processing of the server side proxy 30 in the case of receiving one request message from the client side proxy 40, but when the request messages are received simultaneously from a plurality of client side proxies 40, the processing of FIG. 31 is carried out in parallel when each request is received.

Note also that FIG. 31 is an exemplary procedure for the case where the FP compression is not used in the transfer of the request message from the client side proxy 40 to the server side proxy 30, and the FP compression is used in the transfer of the reply message from the server side proxy 30 to the client side proxy 40.

In the following, the request source client side proxy is a client side proxy corresponding to a request source client in the processing of a pair of a request message and a reply message, i.e., a client side proxy which is a source of a request message and a destination of a reply message.

When the request message is received from one client side proxy (i.e., the request source client side proxy) 40 among a plurality of client side proxies (step S41), the server side proxy 30 transmits it to the server 20 which is a destination (step S42). At this point, the processing for this pair of the request message and the reply message once enters a state waiting for the receiving of the corresponding reply message.

Then, when the server side proxy 30 receives the reply message from the server 20 at the reception unit 31 (step S43), the FP compression judgement unit 321 checks and judges whether the reply data of this reply message is a target for applying the FP compression or not (step S44). When the reply data is judged as not a target for applying the FP compression (step S44 NO), the received reply message is transferred to the client side proxy 40 from the transmission unit 33 (step S50).

When the reply data of this reply message is judged as a target for applying the FP compression at the step S44, at the FP cache management unit 322, the contents dependent information value of the fingerprint of this reply data is calculated (step S45) and the fingerprint is obtained by attaching the own server side proxy identification information to that contents dependent information (step S46). Then, the fingerprint cache 34 corresponding to the request source client side proxy 40 is searched through by using this fingerprint value as a key (step S47).

When a set of this fingerprint value and the corresponding data is registered in the fingerprint cache 34 corresponding to that request source client side proxy 40 (step S48 YES), the received reply message is converted into the FP compression format (of FIG. 9B, for example) by using this fingerprint value at the FP compression processing unit 323, and transmitted to that request source client side proxy 40 from the transmission unit 33 (step S49). At this point, a value of a field indicating the data length (Content-Length field) in the reply header is set in accordance with the FP compression format, according to the need.

On the other hand, when a set of this fingerprint value and the corresponding data is not registered in the fingerprint cache 34 corresponding to that request source client side proxy 40 as a result of the search of the step S47 (step S48 NO), the following two operations are carried out.

(1) The received reply message is converted into a non-FP compression format (of FIG. 9A, for example) (by using this fingerprint value according to the need) at the FP compression processing unit 323, and transmitted to the client side proxy 40 from the transmission unit 33 (step S51)

(2) This fingerprint value and this reply data are set in correspondence (the fingerprint value is set as a key) and registered into the fingerprint cache 34 corresponding to that request source client side proxy 40 at the FP cache management unit 322 (step S52).

Note that these operations (1) and (2) can be carried out in any desired order or in parallel.

Now, in the examples described so far, at a time of transferring the reply data from the server side proxy 30 to the client side proxy 40, if this reply data is the same as that registered in the fingerprint cache, the network traffic is reduced by transferring the corresponding fingerprint instead of this reply data. This FP compression can be applied also to the case of transferring the request data from the client side proxy 40 to the server side proxy 30 as well. Note that it is also possible to apply the FP compression only to the case of transferring the request data from the client side proxy 40 to the server side proxy 30.

In the case of applying the FP compression to the request data transfer from the client side proxy 40 to the server side proxy 30, the roles of the server side proxy 30 and the client side proxy 40 with respect to the reply data described above should be interchanged. In the case of applying the FP compression to both the request data transfer and the reply data transfer, the server side proxy 30 and the client side proxy 40 should have a fingerprint decompression processing unit and a fingerprint compression processing unit (or a fingerprint compression/decompression processing unit that combines a fingerprint compression processing unit and a fingerprint decompression processing unit).

Also, in this case, in the server side proxy 30 and/or the client side proxy 40, it is possible to provide the fingerprint cache for the request data transfer independently from the fingerprint cache for the reply data transfer, and it is also possible to share the same fingerprint cache among the reply data transfer and the request data transfer.

Note that, in this embodiment, the cases of handling the request message to be transferred from the client side proxy to the server side proxy or the reply message to be transferred from the server side proxy to the client side proxy have been described, but in the case where one proxy is connected with both a device for transmitting the request message and a device for transmitting the reply message, or with a device for transmitting both the request message and the reply message, it is of course possible to handle the request message and the reply message to be transferred from the client side proxy to the server side proxy as well as the request message and the reply message to be transferred from the server side proxy to the client side proxy. It is also possible to handle only the request message to be transferred from the client side proxy to the server side proxy and the request message to be transferred from the server side proxy to the client side proxy, for example.

Also, up to this point, the embodiment in which the entire data contained in one message is a target for applying the FP compression (a target for the registration into the fingerprint cache) has been described, but in the case where the data contained in one message is formed by a set of prescribed unit data, for example, it is also possible to set only a part of the unit data contained in one message as a target for applying the FP compression (a target for the registration into the fingerprint cache).

As described, according to the present invention, correspondences between data and their names are registered at the data transfer devices and the corresponding names are transferred, instead of transferring the data, for those data for which the correspondences are registered, so that it is possible to reduce the amount of transfer data among the data transfer devices.

For example, even when the reply message of the GET method is a private data, it is possible to compress this message by using the fingerprint and transfer it between the data transfer devices. Also, for example, even when the reply message of the GET method is a dynamic data, it is possible to compress this message by using the fingerprint and transfer it between the data transfer devices as long as the content of the data is the same. Also, for example, even in the case of using the POST method, it is possible to compress the data by using the fingerprint and transfer it between the data transfer device as long as the resulting data is the same.

Also, for example, by registering the data written by the PUT method into the fingerprint cache, when this data is to be read out as a result of the GET method or the POST method, it is possible to compress this data by using the fingerprint and transfer it between the data transfer devices.

According to the present invention, a data transfer device on a first communication device side maintains a correspondence between data and its name, with respect to each other data transfer device on a second communication device side, and at a time of transferring some data to some other data transfer device, the corresponding name is transferred instead of transferring the data for which this correspondence is maintained, with respect to that some other data transfer device, so that it is possible to reduce the amount of transfer data between the data transfer devices.

Also, when the data transfer device on the first communication device side and the other data transfer devices on the second communication device side are connected in one-to-multiple manner, the data transfer device on the first communication device side manages the correspondence between the data and its name for each one of the other data transfer devices on the second communication device side, so that when some data is to be transferred, it is possible to avoid transferring its name instead of that some data to the other data transfer device which does not share the correspondence between that data and its name.

Also, according to the present invention, each data transfer device on a first communication device side maintains a correspondence between data and its name, which is formed by a data transfer device identification information of each data transfer device and data dependent information generated according to a content of that data, with respect to another data transfer device on a second communication device side, and at a time of transferring some data to the another data transfer device, the corresponding name is transferred instead of transferring the data for which this correspondence is maintained, with respect to the another data transfer device, so that it is possible to reduce the amount of transfer data between the data transfer devices.

Also, when the data transfer devices on the first communication device side and the another data transfer device on the second communication device side are connected in multiple-to-one manner, the names of data will be different when the data transfer devices on the first communication device side are different, so that it is possible to avoid having the identical name for different data contents and it becomes possible to maintain the consistency in the correspondence between the data and the name.

Also, according to the present invention, each data transfer device on a first communication device side maintains a correspondence between data and its name, which is formed by a data transfer device identification information of each data transfer device and data dependent information generated according to a content of that data, with respect to each other data transfer device on a second communication device side, and at a time of transferring some data to some other data transfer device, the corresponding name is transferred instead of transferring the data for which this correspondence is maintained, with respect to that some other data transfer device, so that it is possible to reduce the amount of transfer data between the data transfer devices.

Also, when the data transfer devices on the first communication device side and the other data transfer devices on the second communication device side are connected in multiple-to-multiple manner, it becomes possible to maintain the consistency in the correspondence between the data and the name as described above, and each data transfer device on the first communication device side manages the correspondence between the data and its name for each one of the other data transfer devices on the second communication device side, so that when some data is to be transferred, it is possible to avoid transferring its name instead of that some data to the other data transfer device which does not share the correspondence between that data and its name.

It is to be noted that the above described embodiments according to the present invention may be conveniently implemented using a conventional general purpose digital computer programmed according to the teachings of the present specification, as will be apparent to those skilled in the computer art. Appropriate software coding can readily be prepared by skilled programmers based on the teachings of the present disclosure, as will be apparent to those skilled in the software art.

In particular, each one of the server side proxy and the client side proxy of the above described embodiments can be conveniently implemented in a form of a software package.

Such a software package can be a computer program product which employs a storage medium including stored computer code which is used to program a computer to perform the disclosed function and process of the present invention. The storage medium may include, but is not limited to, any type of conventional floppy disks, optical disks, CD-ROMs, magneto-optical disks, ROMs, RAMs, EPROMs, EEPROMs, magnetic or optical cards, or any other suitable media for storing electronic instructions.

It is also to be noted that, besides those already mentioned above, many modifications and variations of the above embodiments may be made without departing from the novel and advantageous features of the present invention. Accordingly, all such modifications and variations are intended to be included within the scope of the appended claims.

What is claimed is:

1. A data transfer method at each of a plurality of server side proxies each for receiving a request data transmitted from a client device and destined for a corresponding one of a plurality of servers via a client side proxy, transmitting the request data to the corresponding server, and transmitting a reply data, transmitted from the corresponding server and destined for the client device as a reply to the request data, to the client side proxy, the method comprising:

receiving a reply data from the corresponding server, the reply data being a reply to a request data transmitted from the client side proxy;

generating a finger print including a hash value of the reply data and a server side proxy identification information for identifying the corresponding server side proxy;

storing the finger print and the reply data in a corresponding manner as an entry into one of consecutive areas of a finger print cache;

receiving another reply data from the corresponding server, the currently received reply data being a reply to another request data currently transmitted from the client side proxy;

generating the finger print of the currently received reply data;

determining whether the currently generated finger print is stored in the finger print cache;

transmitting the currently generated finger print in place of the currently received other reply data to the client side proxy for the client device which finally receives the currently generated finger print when the currently generated finger print is stored in the finger print cache; and storing the currently generated finger print and the currently received reply data in a corresponding manner as an entry into one of the consecutive areas of the finger print cache and transmitting the currently received reply data to the client side proxy for the client device which finally receives the currently received reply data when the currently generated finger print is not stored in the finger print cache.

2. A plurality of server side proxies each for receiving a request data transmitted from a client device and destined for a corresponding one of a plurality of servers via a client side proxy, transmitting the request data to the corresponding server, and transmitting a reply data, transmitted from the corresponding server and destined for the client device as a reply to the request data, to the client side proxy, each server side proxy comprising:

a receiving unit configured to receive a reply data from the corresponding server, the reply data being a reply to a request data transmitted from the client side proxy;

a finger print generating unit configured to generate a finger print including a hash value of each reply data and a server side proxy identification information for identifying the corresponding server side proxy;

a storing unit configured to store the finger print and each reply data in a corresponding manner as an entry into one of consecutive areas of a finger print cache thereof;

a determining unit configured to determine whether a currently generated finger print of a reply data currently received is stored in the finger print cache; and a transmitting unit configured to transmit the currently generated finger print in place of the currently received reply data to the client side proxy for the client device which finally receives the currently generated finger print when the currently generated finger print is stored in the finger print cache, and store the currently generated finger print and the currently received reply data in a corresponding manner as an entry into one of the consecutive areas of the finger print cache and transmit the currently received reply data to the client side proxy for the client device which finally receives the currently received reply data when the currently generated finger print is not stored in the finger print cache.

3. The plurality of server side proxies according to claim 2, wherein the client side proxy is connected to the client device via a first local area network, and each server side proxy is connected to the corresponding server via a second local area network.

4. The plurality of server side proxies according to claim 2, wherein the client side proxy is connected to each server side proxy via an Internet.

5. A computer program product stored in a computer storage medium, for causing a computer when executing the computer program product to function as each of a plurality of server side proxies each for receiving a request data transmitted from a client device and destined for a corresponding one of a plurality of servers via a client side proxy, transmitting the request data to the corresponding server, and transmitting a reply data, transmitted from the corresponding server and destined for the client device as a reply to the request data, to the client side proxy, the computer program product comprising:

a first computer program code for causing the computer to receive a plurality of reply data from the corresponding server, the reply data being a reply to a request data transmitted from the client side proxy;

a second computer program code for causing the computer to generate a finger print including a hash value of each reply data and a server side proxy identification information for identifying the corresponding server side proxy;

a third computer program code for causing the computer to store the finger print, and each reply data in a corresponding manner as an entry into one of consecutive areas of a finger print cache;

a fourth computer program code for causing the computer to determine whether a currently generated finger print of a reply data currently received is stored in the finger print cache; and a fifth computer program code for causing the computer to transmit the currently generated finger print in place of the currently received reply data to the client side proxy for the client device which finally receives the currently generated finger print when the currently generated finger print is stored in the finger print cache, and store the currently generated finger print and the currently received reply data in a corresponding manner as an entry into one of the consecutive areas of the finger print cache and transmit the currently received reply data to the client side proxy for the client device which finally receives the currently received reply data when the currently generated finger print is not stored in the finger print cache.

\* \* \* \* \*